May 14, 1940.   G. WINTRITZ   2,201,068
MANUFACTURE OF SLIDE FASTENERS
Filed June 22, 1939   7 Sheets-Sheet 1
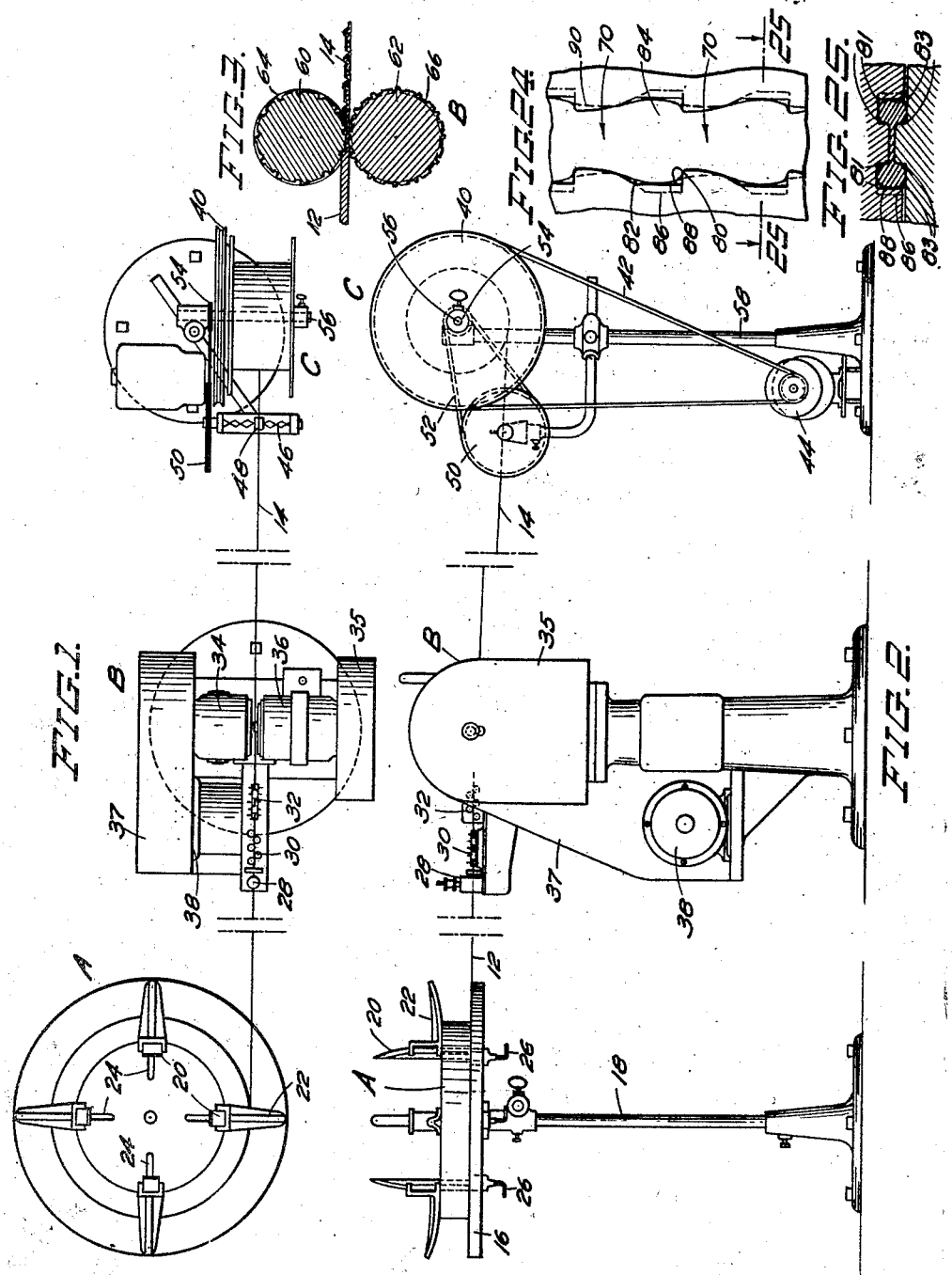
INVENTOR
GEORGE WINTRITZ
BY
James & Franklin
ATTORNEY

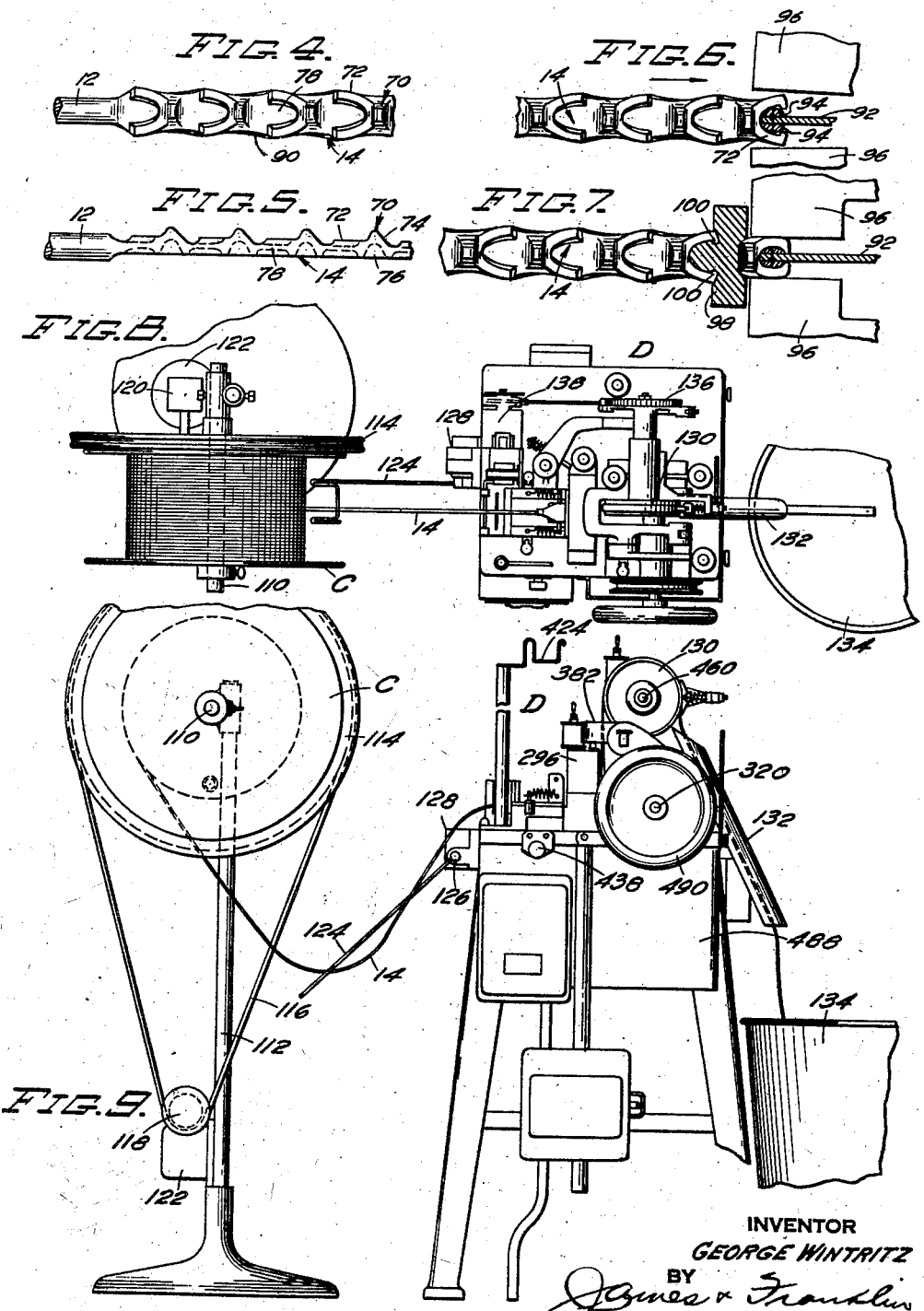

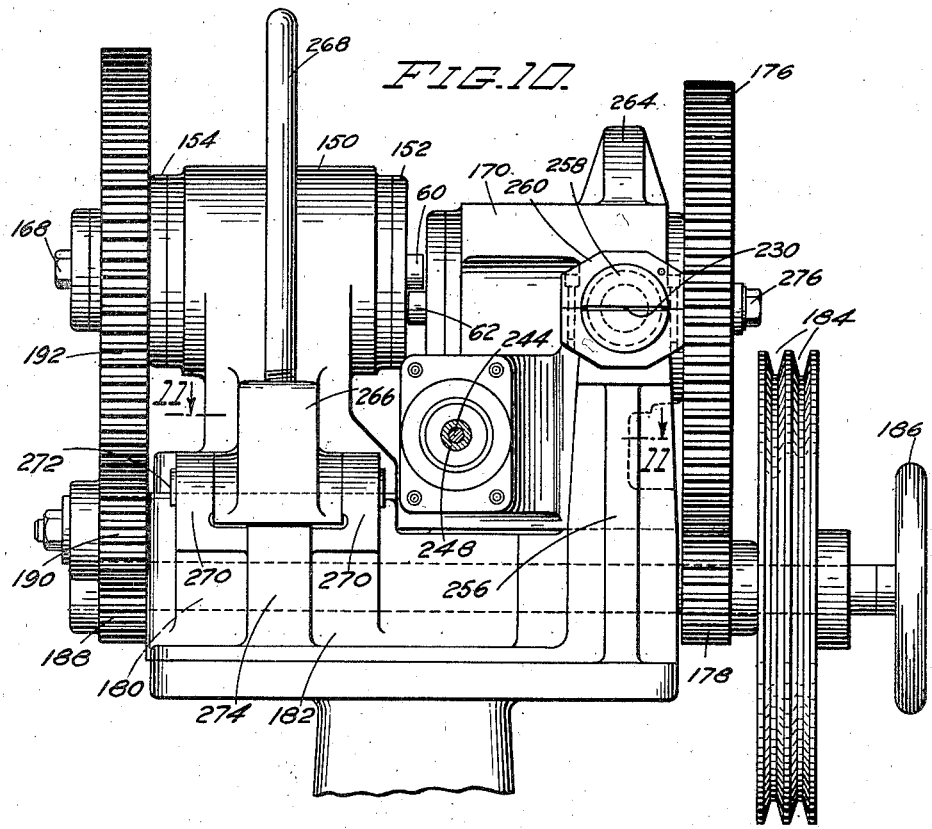
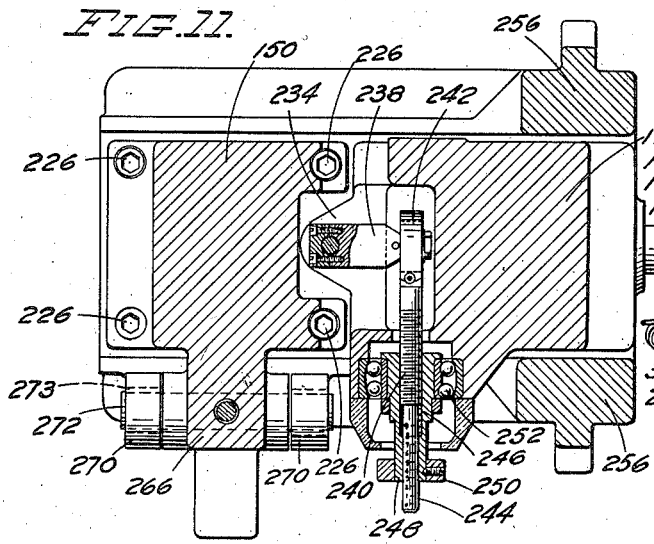
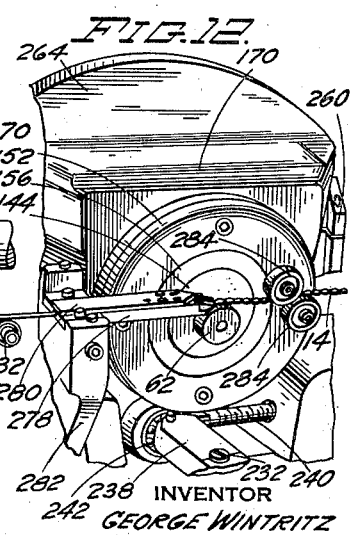

May 14, 1940.　　　　　G. WINTRITZ　　　　　2,201,068
MANUFACTURE OF SLIDE FASTENERS
Filed June 22, 1938　　　7 Sheets-Sheet 4
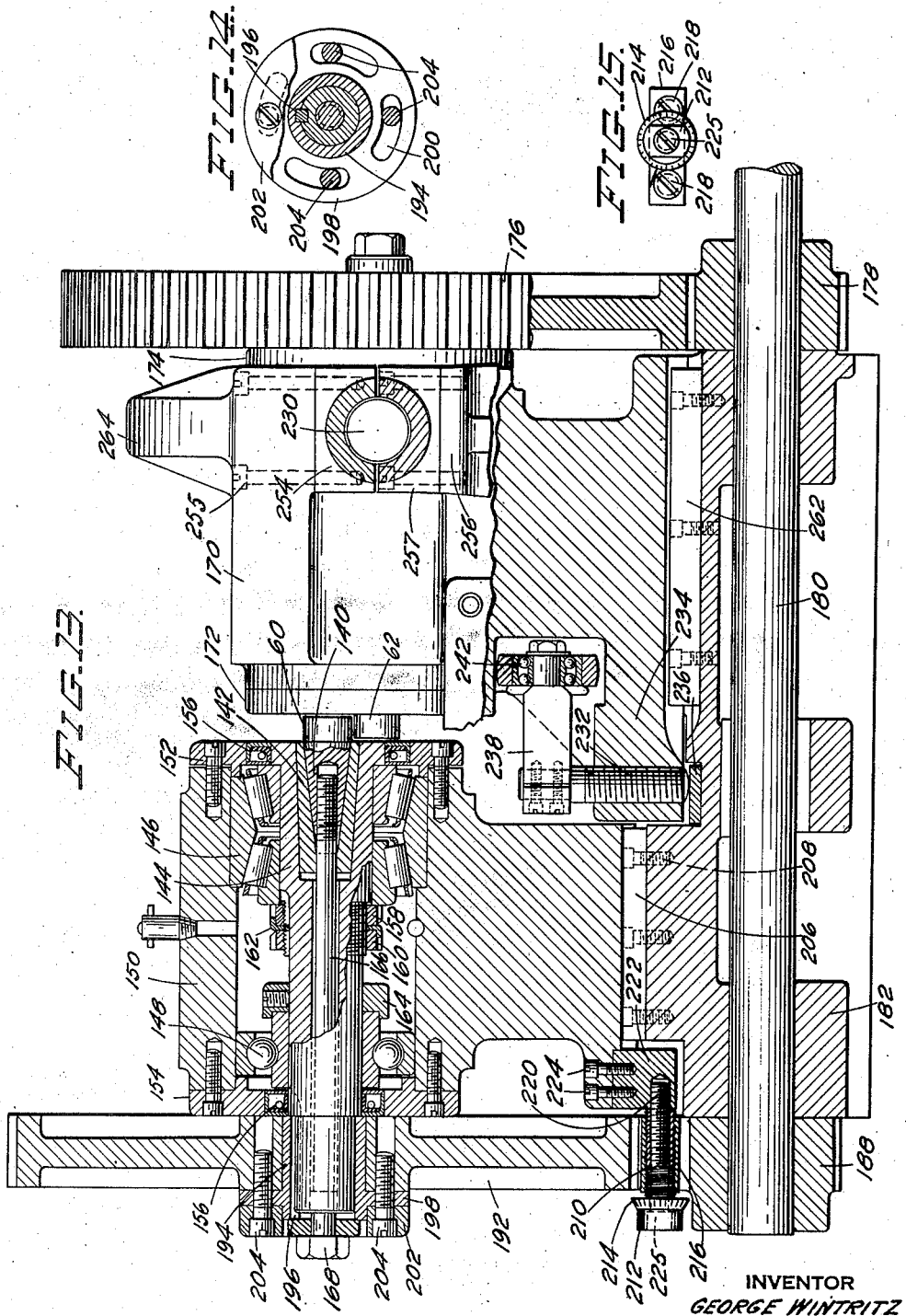
INVENTOR
GEORGE WINTRITZ
BY
ATTORNEY May 14, 1940.   G. WINTRITZ   2,201,068
MANUFACTURE OF SLIDE FASTENERS
Filed June 22, 1938   7 Sheets-Sheet 5
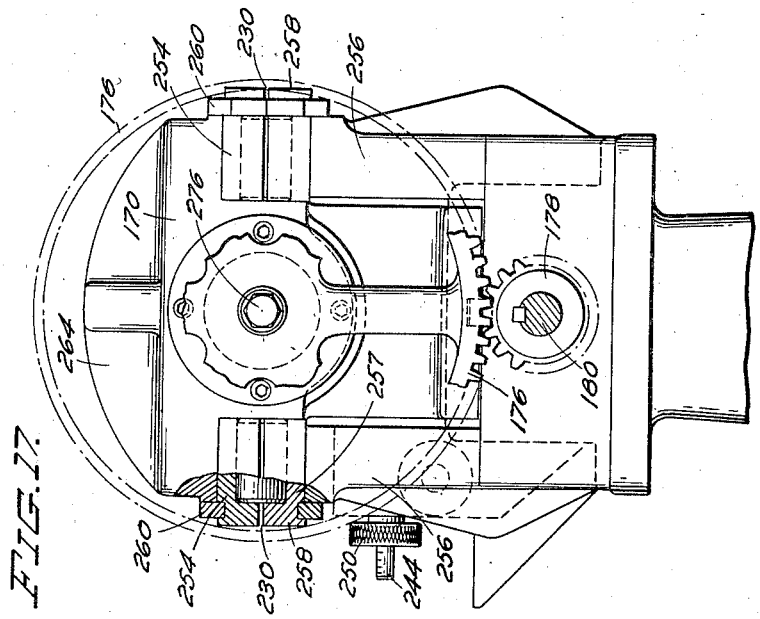
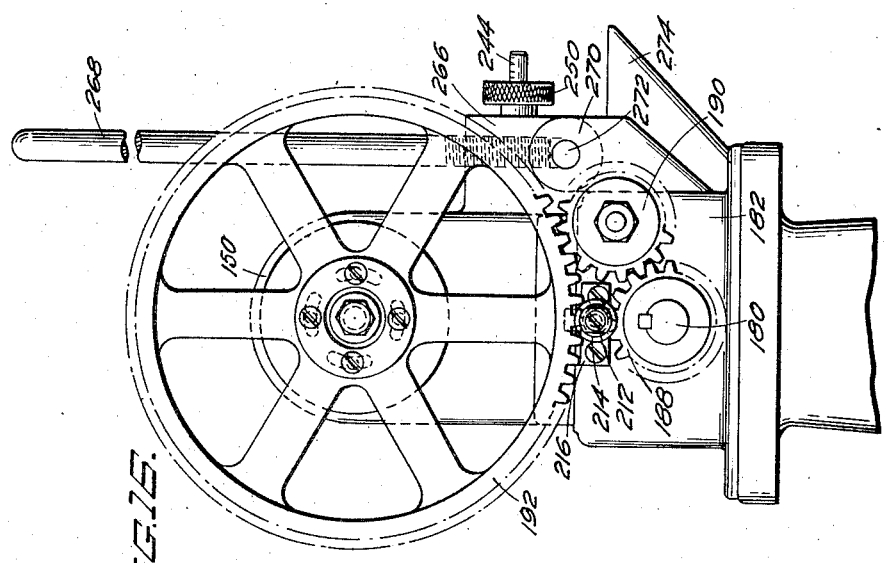
INVENTOR
*GEORGE WINTRITZ*
BY
ATTORNEY

INVENTOR
GEORGE WINTRITZ
BY
ATTORNEY

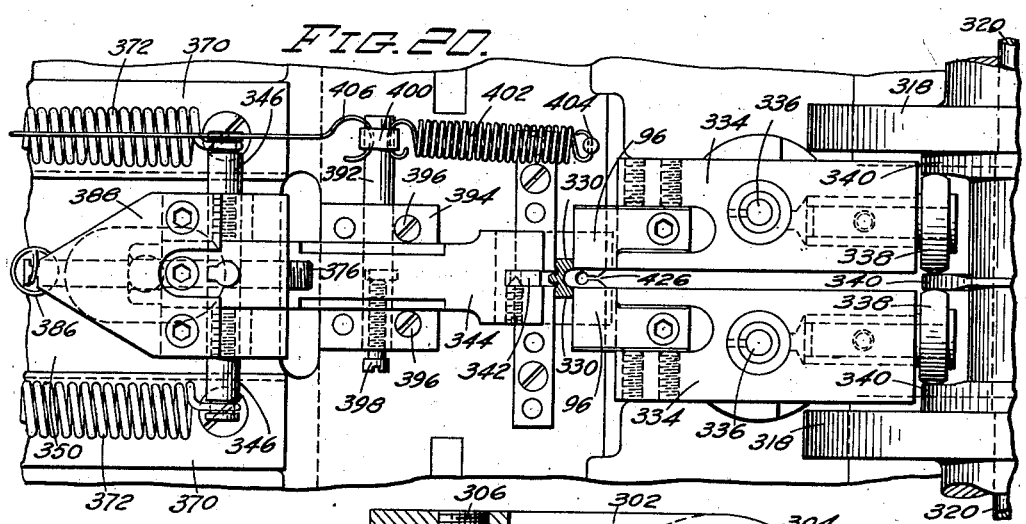
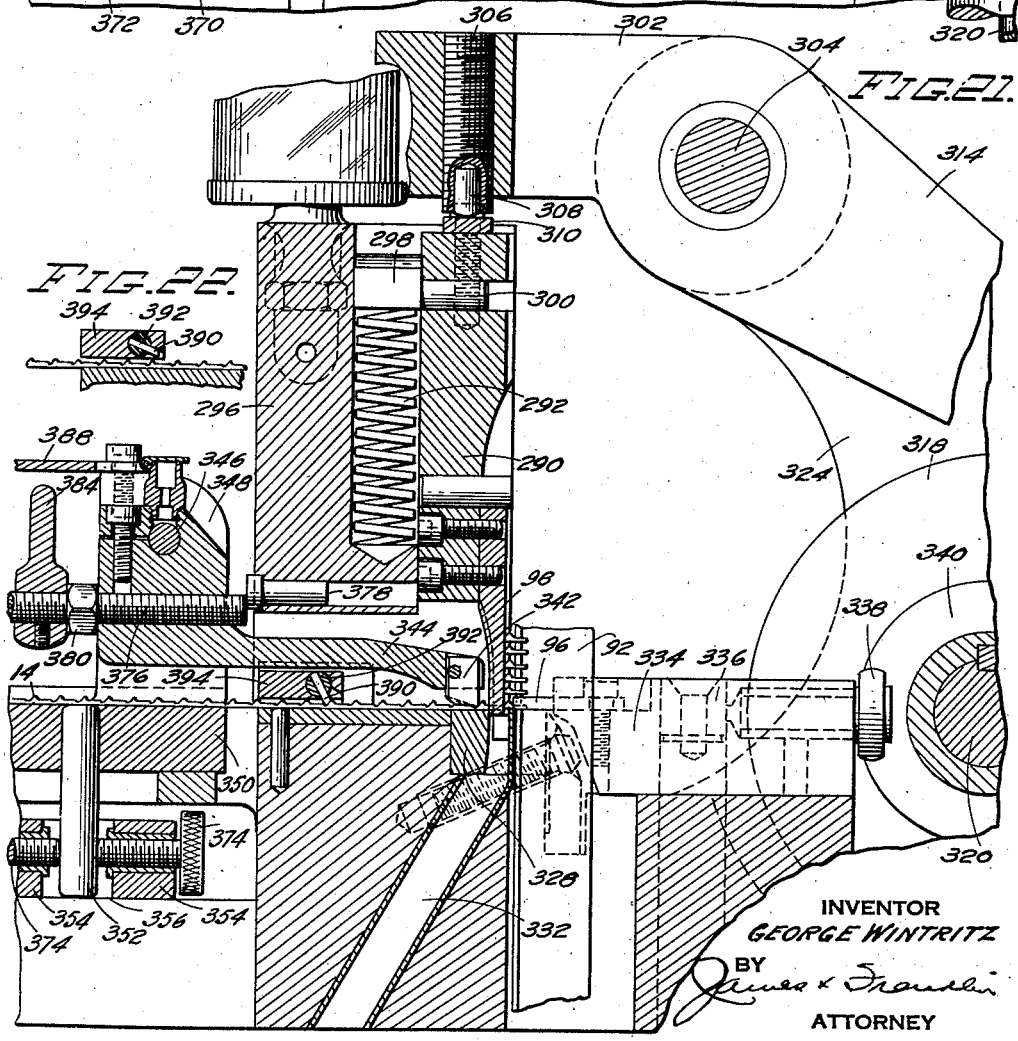

Patented May 14, 1940

2,201,068

UNITED STATES PATENT OFFICE 2,201,068

MANUFACTURE OF SLIDE FASTENERS

George Wintritz, Staten Island, N. Y., assignor to Conmar Products Corporation, Bayonne, N. J., a corporation of New Jersey Application June 22, 1938, Serial No. 215,180

54 Claims. (Cl. 153—1)

This invention relates to the manufacture of slide fasteners.

The primary object of my invention is to generally improve the manufacture of slide fasteners, and more particularly, to simplify, cheapen, and speed up the manufacture of the same.

Practical commercially-used methods of making slide fasteners may be generally sub-divided into methods using two machines, the elements being made in one machine and mounted on the tape by another; and methods using a single machine in which the elements are both manufactured and attached to the tape. With two machines it has heretofore been necessary to hopper the loose elements in order to arrange the same in uniform position. This difficulty is avoided when the elements are made and attached in a single machine, but then the apparatus is less flexible for meeting varied commercial requirements. This is so because with two machines it is possible to manufacture and store up a supply of elements and to later mount the same on tapes in accordance with orders received, thus accommodating requirements which vary from day to day as regards stringer length, tape color, tape quality, and so on. At the same time, the manufacture of the elements in the first machine is facilitated because the machine may be run at best speed for making the elements without regard to the speed at which the elements may be mounted on the tape, and the tools for making the elements may be replaced or sharpened or repaired whenever necessary, without interfering with the operation of the second machine. Moreover the first machine may operate continuously, without the numerous interruptions which occur in the second machine, particularly for spacing between stringers.

One object of my invention is to overcome the disadvantages of both the single and double machine systems of the prior art, while retaining the advantages of each. For this purpose, I form a connected series of embryo elements from wire or like continuous stock. The embryo elements themselves form a continuous wire, and this "element wire" is a true step product which is reeled and stored in lengths of a mile or more. The reel may be unreeled and fed to a separate machine for merely severing the elements and attaching the same to the tape. In this way, the advantages of using two machines may be obtained without necessitating handling and hoppering of loose elements.

Still another object of my invention is to make possible the use of simple round wire stock, thus minimizing the cost of the raw material, and a further object is to reduce the amount of scrap or waste of stock. Both of these factors contribute to lower the cost of manufacture of the slide fastener.

A further object of my invention is to obtain elements of uniform pitch, despite variations in the diameter, hardness, and "flowability" or ordinary commercial round wire stock. The round wire stock is not merely punched, but is pressed and deformed into a wholly new shape. If these elements are formed by successive reciprocations of a press, the speed of operation is slow, and an even more important difficulty arises because of irregularity in the pitch of the elements. It is very difficult to obtain uniform feed of the wire, and changes in pitch occur even with a uniform feed, because during its extensive deformation the material undergoes a substantial stretch or elongation, but this elongation may vary due to changes in either the diameter or hardness of the original round wire. This results in changes in the pitch or/and length of the elements, and such changes produce irregularities in the slide fastener which spoil the desired smooth, sliding action of the slider, and in extreme cases, may altogether prevent operation.

One primary object of my invention is to overcome this difficulty and to produce an element wire of uniform pitch. A further object of my invention is to greatly increase the speed of manufacture of the embryo fastener elements. These objects I fulfill by pressing and deforming the smooth round wire into the desired series of embryo elements by running the wire between rapidly rotating pressure rolls which are shaped negatively to the desired configuration of the embryo fastener elements. The wire is rolled to desired shape in a single passage through a special form of rolling mill. The rolling process insures uniform pitch, and any variations in hardness and diameter of the original wire manifest themselves as changes in the cross section rather than changes in the length of the elements in the rolled wire.

The embryo elements are formed with spread or divergent jaws. In accordance with my invention as applied to the specific form of fastener element disclosed herein, the jaws are unconfined at the outside, thus accommodating the changes in wire section. Moreover, there is the advantage of leaving the outside of the jaws in smooth, unmarred, and rounded shape. However, it is convenient to have the over-all or maximum breadth of the element wire constant, and to accomplish this is still another object of my invention. This is done by leaving the jaws unconfined except at the side where they are furthest apart. Ample room is provided in the roll for flow of excess metal, and changes in cross section occur, but the maximum width, at the side of the jaws, is held within a desired tolerance.

The shape of the element wire is complex, and the impressions to be formed therein are relatively deep. Moreover, the necessary mutilation of the wire is so great that the wire is greatly elongated as it is pressed to shape, this elongation being, say, one-third, for the specific form of element wire disclosed herein, that is, the length of a reel of this specific element wire is approximately one-third greater than the length of the reel of uniform wire from which it was made. It is therefore difficult to obtain clean accurate shaping of the wire when rolling the same. I have found that the desired result may be attained by using pressure rolls of very small diameter. More specifically, the pressure rolls should be less than two inches in diameter, and I prefer and recommend rolls which are only about one inch in diameter.

While this may be considered an empirical discovery without regard to theory, I believe that one main advantage of the small diameter rolls is in order to avoid confinement of more than a very few elements at one time, thereby avoiding difficulty arising from the elongation of the wire being rolled, which otherwise puts such a strain on the impressions in the rolls that they tend to crack and break. Furthermore, the small roll may be operated with less force because it contacts with only a small length of wire at one time, and this is important when seeking a high unit pressure for the substantial deformation needed to produce the embryo slide fastener elements.

The operation requires the use of exceedingly high pressure on the rolls, and further requires the application of a powerful torque for rotating the rolls. It is therefore important to employ shafts, bearings, and gears which are all massive in size, and sturdy in construction, these parts being very much larger than the relatively tiny hardened pressure rolls which, as previously explained, are preferably only about one inch in diameter. It is acordingly a further object of my invention to reconcile these conflicting requirements and to provide a suitable machine particularly adapted for the rolling of the element wire.

I have already mentioned speed of manufacture as a general object. It will be understood that by this rolling process, the embryo elements may be made at very high speed despite the fact that the rolling mill is the heavy duty part of the apparatus. The attaching machine is a light duty machine, for it need merely sever and attach the elements to the tape and may therefore be run at high speed. I have developed a comparatively small and inexpensive machine for this purpose which may be run at a speed more than double the speed heretofore posible in slide fastener manufacture. Even greater improvement in speed is obtained in the rolling mill, and in actual plant operation the element wire for four or five attaching machines is readily supplied from a single rolling mill.

In the specific form of element wire here disclosed the space between the spread jaws and extending to the head of the next embryo element is filled with metal which is subsequently punched out in the attaching machine. In accordance with a feature and object of my invention, much of this metal is made comparatively thin to reduce waste. Moreover, a thin web makes possible a desired slope at the end of the head, so as to produce a triangular rather than rectangular profile.

Further objects of my invention center about the rolling machine, and are to provide axial and rotational adjustment of one of the pressure rolls relative to the other in order to obtain registration of the rolls, and to obtain a micrometric precision adjustment of the spacing between the rolls so that this spacing may be varied slightly when necessary or desirable because of substantial change in the dimension or character of the round wire stock. Another object is to provide means facilitating movement of one of the main bearing housings out of the way of the other, thereby clearing each of the rolls from the opposite bearing in order to make it possible to remove the rolls.

Still further objects of my invention center about the attaching machine, and one such object is to provide a loop of slack wire between the heavy reel of wire and the feed means of the attaching machine, said slack being maintained between desired limits by a suitable intermittently operated motor for unwinding the reel. Other objects are simplicity and high speed, for which purposes I operate a severing punch, clamping jaws, wire feed means and tape feed means all from a single main cam shaft, while keeping said reciprocating parts small and light and short in stroke. Another object is to provide a feed dog which engages the wire at a point just ahead of and very close to the severing punch. Another object is to interrupt the feed of the element wire to the tape when providing a blank space of tape between stringers, and this is done by means of a counter controlling a solenoid, in the specific case here illustrated, which elevates a check dog associated with the feed dog for the element wire. Still another object is to bring the inside of the spread jaws of the elements to desired shape after they have been only roughly shaped by the rolling mill, and this is done by means of the severing punch. This, in the specific case here illustrated cuts away the web of waste metal between elements, said punch being so shaped as to also cut away some of the metal inside of the jaws, in addition to the web, and thereby bring the jaws to the desired shape.

To the accomplishment of the foregoing and other objects which will hereinafter appear, my invention consists in the method steps and apparatus elements and their relation one to the other, as hereinafter are more particularly described in the specification and sought to be defined in the claims. The specification is accompanied by drawings in which:

Fig. 1 illustrates the rolling mill and associated apparatus for deforming wire stock into the desired series of elements;

Fig. 2 is an elevation of the same;

Fig. 3 is a section through the pressure rolls and is explanatory of the operation of the same;

Fig. 4 is a plan view of a piece of round wire stock showing the manner in which it is deformed to produce the embryo elements;

Fig. 5 is a side elevation of the same;

Figure 18:
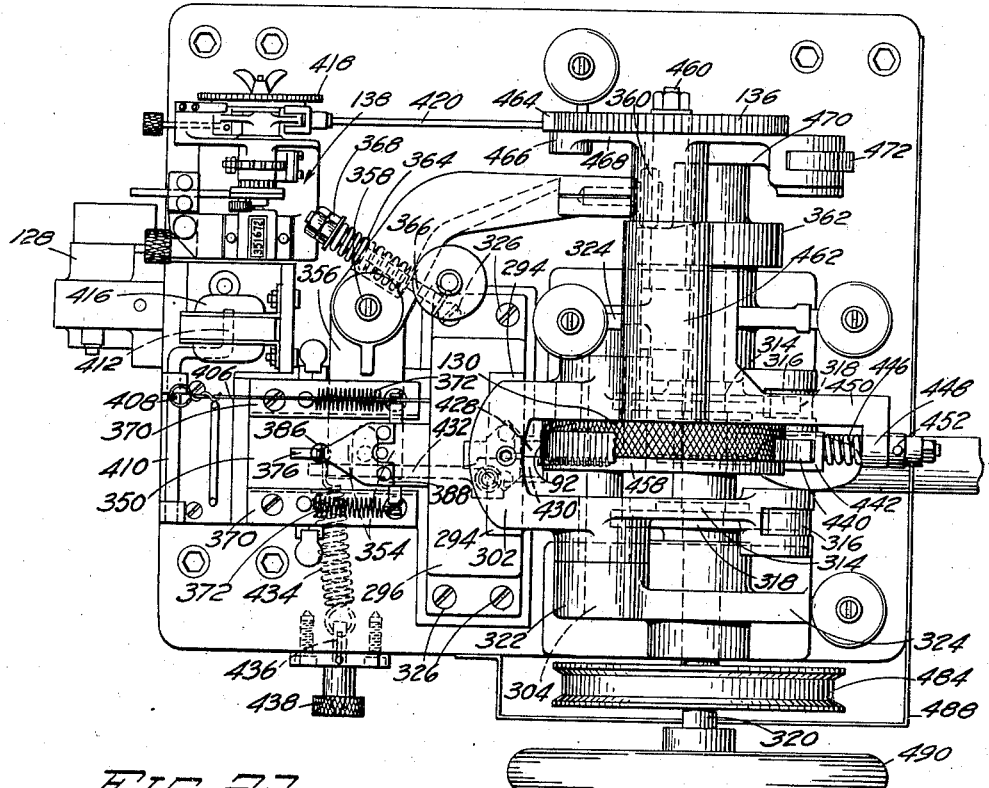
Figure 23:
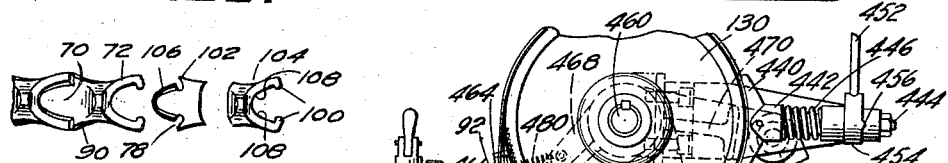
Figure 19:
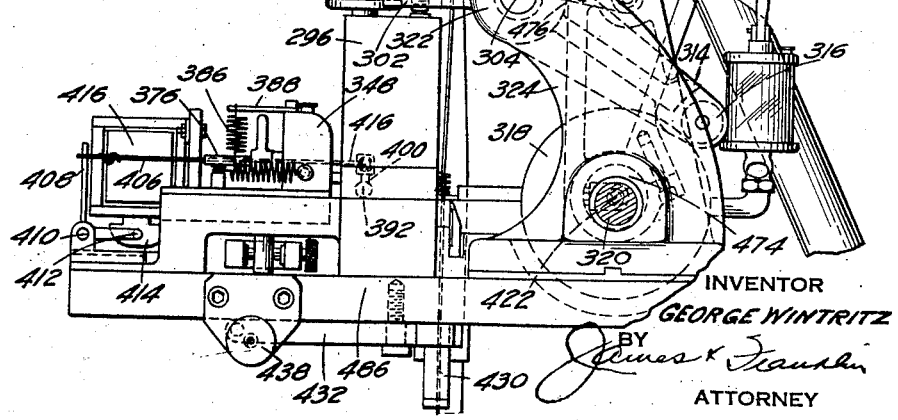

Fig. 6 schematically illustrates a preliminary step in the finishing and attaching of an element;

Fig. 7 illustrates the final steps in the finishing and attaching of an element;

Fig. 8 is a plan view of the attaching machine;

Fig. 9 is an elevation of the same;

Fig. 10 is a partially sectioned elevation of the rolling mill;

Fig. 11 is a horizontal section taken in the plane of the line 11—11 of Fig. 10;

Fig. 12 illustrates the lower pressure roll and bearing as seen when the upper bearing is tilted out of the way;

Fig. 13 is a partially sectioned side elevation of the rolling mill;

Fig. 14 is explanatory of the rotative adjustment of the rolls;

Fig. 15 is explanatory of the axial adjustment of the rolls;

Fig. 16 is an end elevation of the rolling mill;

Fig. 17 is a partially sectioned elevation of the opposite end of the rolling mill;

Fig. 18 is a plan view of the attaching machine;

Fig. 19 is a side elevation of the same;

Fig. 20 shows a part of the attaching machine in plan to enlarged scale;

Fig. 21 is a section taken in elevation through a part of the attaching machine drawn to enlarged scale;

Fig. 22 is a detail of the feed check dog;

Fig. 23 illustrates the scrap or waste which is punched away during finishing and attaching of the elements to the tape;

Fig. 24 is explanatory of the design of the female roll, and

Fig. 25 is a section on the line 25—25 of Fig. 24.

Referring to the drawings, and more particularly to Figs. 1 through 9, a reel A of uniform wire is fed through a special form of rolling mill B which deforms the wire into a connected series of embryo elements, which may for brevity be referred to as "element wire." This element wire is wound up on a take-up reel C. The pressing of the wire in the rolling mill is schematically shown in Fig. 3. The nature of the change produced in the wire, that is, its conversion from a simple round wire 12 into the element wire 14, is illustrated in Figs. 4 and 5. The reel C of element wire may be stored away until needed, and when needed, is mounted in front of an attaching machine D, as is clearly shown in Figs. 8 and 9. This machine completes the elements and attaches the same in properly spaced relation along the edge of a tape.

Considering the method of the invention in somewhat greater detail, and referring first to Figs. 1 and 2, a reel of ordinary commercial wire stock is placed on a rotatable table 16 carried on a stand 18. The wire is preferably ordinary round wire and is therefore inexpensive compared to stock of special cross-section. The reel is centered on the table by guides 20, and is held in original compact condition by spokes 22 adjustably mounted on guides 20. The radial position of the guides is adjustable in slots 24 and is maintained by clamps 26. It may be mentioned that when the reels of wire are purchased on wooden reels, the wire may be unwound directly from the wooden reels, and in such case it is not necessary to mount the reel on a vertical axis, it being more simply mounted on a horizontal axis.

The wire next passes through a lubricating station 28 and then through horizontal and vertical sets of straightening rolls 30 and 32. The wire then passes between the pressure or forming rolls. For reasons explained in greater detail hereinafter, these rolls are relatively tiny, having a diameter of, say, one inch, but they are pressed against the wire with such a high pressure that they are mounted in massive shafts having a diameter far greater than that of the rolls themselves. These shafts are carried in massive bearings 34 and 36 which extend in opposite directions away from the rolls. The shafts are geared together through an appropriate countershaft and heavy gearing, the gearing being concealed in Figs. 1 and 2, by guards 35 and 37, but exposed in Figs. 10 through 17 of the drawings. The rolling mill is driven by a motor 38. The formed wire 10 leaving the mill is wound up on reel C, this being rotated by a pulley 40 driven through belt 42 by a motor 44. The element wire is moved slowly back and forth over the surface of the reel C in order to wind the wire up in smooth successive layers. This is done by means of a two-way screw 46 which reciprocates a nut 48 back and forth, said nut carrying a guide for the element wire. Screw 46 is driven by a pulley 50 which in turn is operated through belt 52 by means of a pulley 54 mounted on the shaft 56 carrying the reel C and pulley 40 previously referred to. Shaft 56 and feed screw 46 are both carried on a suitable stand 58.

Referring to Fig. 3, the upper pressure roll 60 is formed negatively to one side of the element wire 14, while the lower pressure roll 62 is formed negatively to the other side. The pitch diameters of both rolls are equal, but in the specific case here illustrated the apparent diameters differ, this being so because I treat the upper roll 60 as a female roll having depressions formed therein, and I treat the lower roll 62 as a male roll having protuberances projecting therefrom. In respect to the operation upon the wire, however, the rolls may be considered to be and are equal in diameter and are therefore rotated at equal rotative speeds to produce equal linear speeds. It will be understood that when there are apparently unequal diameters, as here shown, there is preferably a little clearance between the peripheries 64 and 66 of the rolls, so that they do not actually engage one another in rolling contact.

Referring now to Figs. 4 and 5, the embryo elements comprise an embryo head portion 70 and spread or divergent embryo jaws 72. The head portion 70 is conventional in comprising a projection 74 and a recess 76. The embryo elements all point in one direction and this direction is head first when leaving the rolling mill, so that the embryo elements are wound up on the reel pointing head first. The main reason for this is so that they will be unwound pointing jaws first, this being of particular convenience in connection with the operation of the attaching machine, as will be subsequently described. The embryo jaws of one embryo element are connected to the embryo head of the next embryo element, and in the specific case here illustrated the connection is by means of a web of metal 78. The web is made relatively thin in order to minimize the amount of waste stock produced when finishing and serving the elements.

The metal is not truly confined at the outsides of the embryo jaws, and no fin is produced at this point. Referring to Fig. 24, I show a development of the female roll, and may emphasize the existence of spaces 80 and 82 outside the element strip 84 (only the outline of which is shown). I have made and successfully used many rolls in which the outside of the cavity is intentionally disposed at great width, as is indicated by the broken line outline 86. In such case, there is obviously no confinement whatsoever at the outside of the jaws of the elements as they pass through the rolling mill, and any variation in diameter or hardness or flowability of the wire (for the wire may vary in flowability even while showing the same apparent hardness by Rockwell test, due to differences in the annealing treatments when drawing the wire) is taken up by a change in breadth of the element wire, there being no substantial change in pitch or element length. With the side wall of the cavity defined by line 88 instead of line 86, substantially the same result is obtained, for there is ample space in which excess metal may flow, as is shown in plan at 80 and 82 in Fig. 24, and as shown in section at 81 and 83 in Fig. 25. Fig. 25 also shows how the outside walls of the jaws are left with a rounded surface, resulting in a smooth-feeling and easy sliding fastener.

The advantage of producing a slight confining effect at the outside of the jaws, as by means of the wall 88, is that the outside or maximum width of the element wire is maintained constant, and this is of convenience when subsequently handling the wire in the attaching machine, in order that the wire may be fed between and accurately guided by suitable guides engaging the side edges of the element wire. The slight confinement produced by the straight walls 88 is not sufficient to materially mold or change the configuration at the outside of the jaws, and is not such as will produce a fin, the jaws being left as smooth and unmarred by fin as when using rolls having the widely spaced walls 86.

The metal is confined, however, at the heads 70, and this produces a slight fin indicated by the broken line at 90 in Fig. 24. The fin is also indicated at 90 in Fig. 4. The presence of this fin depends upon the diameter, etc. of the wire, and is of no great consequence because it is thin, and readily bent over when the completed slide fastener is run through calibrating rolls which are customarily used in this art somewhere near the end of the manufacturing process.

Referring now to Figs. 6 and 7, the element wire 14 is unwound from the reel with the embryo elements pointing jaws first. A tape 92 of conventional character is supported and arranged for intermittent feed movement in a direction transverse to the direction of movement of the element wire 14. The edge of tape 92 is provided with the conventional bead or cord, this being formed in the present case by stitching two cords 94 on opposite sides of the edge of the tape. The element wire is fed forwardly until the spread jaws 72 of the leading element are placed astride the edge of the tape. The apparatus is provided with clamping plates 96 for closing the jaws 72 on the tape, this step being indicated in Fig. 7. The attaching machine is also provided with a punch 98 so shaped as to cut away the waste metal between the elements and thus sever the endmost element from the remainder of the element wire, as is shown in Fig. 7. After the element has been attached to the tape, the tape is moved longitudinally an amount equal to the spacing between elements. The element wire 14 is then advanced longitudinally until the next element is placed with its jaws astride the tape, as shown in Fig. 6. The element is then severed and attached, and this operation is repeated until the desired length of stringer is obtained. It will be observed that the shape of punch 98 is such as to finish shaping the jaws, including the small projections or hooks 100 at the ends of the jaws. The embryo elements in the element wire have only embryo jaws, which are not really in finished shape. The desired configuration is too complex to be produced in a simple rolling operation. However, by causing the punch 98 to cut away not only the thin web 76, but also some of the thicker sloping wall therearound, the jaws may be brought to desired final shape. This is illustrated in Fig. 23 in which the number 102 designates a piece of waste metal or scrap struck from the element wire to form the finished element 104. It will be noted that the piece 102 has a flange of metal 106 surrounding the web 76. This results from trimming the jaws to the final configuration shown at 108 and including the hooks 100. The severing operation shapes the head end of one element and the jaws of the next succeeding element.

The severing operation and jaw closing operations are performed almost simultaneously, for the attaching machine works at very high speed. The element may be severed from the element wire before or after attaching the same to the tape. I have practiced the invention both ways and there are certain advantages attendant upon either. When the element is attached first, it may be tilted at an angle, when the punch is dull, or due to a bend in the element wire. When the element is severed first, it may be swung laterally to an improper angle due to greater strength in one of the two jaws, as when the jaws have not been cut perfectly symmetrically. This is avoided when the element is severed last, for the element is supported during the jaw closing operation by its attachment to the element wire. The timing of the punch, and the punch location in the particular apparatus here disclosed is such that the jaws are closed slightly ahead of the severing operation.

Referring now to Figs. 8 and 9, the reel C is mounted on a shaft 110 carried on a stand 112. Shaft 110 is provided with a pulley 114 and this is connected through a belt 116 to a pulley 118 driven through worm reduction gearing 120 by a small motor 122. Motor 122 functions to wind element wire 14 off reel C, thus providing a freely hanging loop of wire between the reel and the attaching machine D in order that the latter may function without any strain or resistance such as would be caused if the feed mechanism of the attaching machine had to physically turn the comparatively large, heavy reel C. No attempt is made to run the motor 122 at exactly the right speed, and this would in any event be a difficult task because the diameter of the reel changes as the wire is unwound, and the requirements of the attaching machine vary as the space between successive stringers is reached. As will be understood by those skilled in the art, the stringers are ordered in lengths specified by the user of the same, and these lengths may vary anywhere from a few inches to several feet or even yards. A waste piece of tape is desired at each end of the stringer in order to facilitate attachment of the slide fastener to the purse, luggage, clothing, or other article on which it is being used. It is customary to make the stringers on a continuous tape with spaces or interruptions between successive stringers. Ordinarily a space of two or three inches is left without fastener elements between successive stringers, and these spaces are produced by interrupting the feed of element wire to the attaching machine.

Because of these difficulties, I maintain the desired slack or loop of element wire between the reel C and the attaching machine D by means of a feeler arm 124 which rests lightly on the element wire and the end of which is pivoted on the attaching machine at 126. It is there connected to a mercury or other suitable switch carried in housing 128, and this switch controls the operation of wind-off motor 122. The motor is set into operation whenever arm 124 rises to a desired point, and is stopped when arm 124 sinks to a desired lower limit. In this way a loop of slack wire is maintained between the upper and lower limits defined by arm 124 and its associated switch.

The attaching machine will be described in greater detail hereinafter, but at this point it may be briefly pointed out that the tape rises vertically past the attaching station and is turned about a feed drum 130 from which the finished stringer is led downwardly through tube 132 into a basket 134. The drum 130 acts as a feed means for the tape and is itself intermittently turned by a ratchet wheel 136 operated on by a suitable feed dog. The stringer length is determined by a suitable counter 138, and at appropriate intervals determined by the counter 138, the feed of the element wire is interrupted, while the feed of the tape proceeds as before, thus producing the desired spaces between stringers. The counter 138 may be of the type discussed in a co-pending application Serial No. 214,254 filed June 17, 1938, now Patent No. 2,167,259, issued July 25, 1939.

The preferred forms of apparatus used in the practice of my invention are more fully described hereinafter.

The rolling mill

The general arrangement and operation of the rolling mill has already been described with reference to Figs. 1, 2, 3 and 24. The details of the rolling mill itself are now described with more particular reference to Figs. 10 through 17 of the drawings. Referring to those figures, the upper roll 60 is formed with a conical shank 140 (Fig. 13) received in a matingly tapered member 142 which is itself received with a tapered fit in a main shaft of massive dimension 144. Shaft 144 is carried in a tapered roller bearing 146, this bearing functioning to prevent axial movement as well as to take the direct radial thrust of the roller. The outer end of shaft 144 is carried in a ball bearing 148, this bearing being subjected primarily to radial thrust. The bearings are carried in a massive bearing housing 150 the ends of which are closed by bearing caps 152 and 154. These are provided with leather oil seals 156. The outer race of bearing 146 is held in place by bearing cap 152. The inner races are held in place by nuts 158 and 160 threadedly received on the main shaft and held against relative rotation by the oppositely bent tabs of a suitable lock washer 162. Bearing 148 is held in place by collar 164. The roll 60 is internally threaded and is drawn into the main shaft carrying the same, by means of a suitable draw bolt 166 the head 168 of which is exposed at the end of the machine.

The lower roll 62 is carried in the same way in a similar main shaft which in turn is carried in the same way in similar tapered bearings and ball bearings. These bearings are carried within a massive bearing housing 170 the ends of which are closed by bearing caps 172 and 174. Insofar as the bearing housings differ from one another in order to make possible certain desirable adjustments, these differences and the reasons therefor will be pointed out hereinafter. At this time I shall proceed with a description of the main driving elements of the rolling mill. Referring to Fig. 10, the shaft of lower roll 62 has a gear 176 secured to its outer end. This gear meshes with a pinion 178 carried on a countershaft 180. Countershaft 180 extends through the elevated base 182 of the machine and carries pulleys 184 which are belted to the driving motor of the rolling mill. Hand wheel 186 is provided for use during adjustment of the machine.

The opposite end of countershaft 180 carries a pinion 188 meshing with an idler pinion 190 which in turn meshes with a gear 192 carried at the outer end of the main shaft of upper roll 60. The relation of pinion 188, idler 190 and gear 192 will be clear from inspection of Fig. 16. This may be compared with Fig. 17, showing a direct engagement between pinion 178 and gear 176 at the opposite end of the machine. Pinions 178 and 188 are preferably identical in pitch, diameter and number of teeth, and the same applies to the gears 176 and 192. The rolls are therefore driven at equal rotative speeds but in opposite directions, due to the effect of the direction-reversing idler 190. The desired clearance between the teeth of pinion 188 and gear 192 is obtained because of the difference in elevation of the rolls 60 and 62, the idler 190 being associated, of course, with the upper roll.

It will be seen that with the arrangement here disclosed, the rolls may be small in diameter, yet may operate on the wire with a tremendous pressure and torque obtained by mounting the rolls in massive shafts and bearings having a diameter many times that of the rolls and driving the same through massive gearing made possible through the indirect countershaft drive.

For most efficient operation, it is desirable to provide for relative adjustment of the rolls in order to bring the impressions therein into perfect registration. I provide for rotative adjustment, axial adjustment, and for radial adjustment of the spacing between the rolls.

The rotative adjustment may be explained with reference to Figs. 13 and 14 of the drawings. Gear 192 is not secured directly to the main shaft 144. Instead, it is carried on a sleeve 194 keyed to main shaft 144 by means of key 196. Sleeve 194 is flanged at 198, and this flange is provided with a series of slots 200 best shown in Fig. 14. A ring 202 is placed over flange 198 and the flange is locked between ring 202 and the hub of gear 192 by means of bolts 204. It will be understood that by loosening the bolts 204, it is possible to oscillate gear 192 relative to roll 60, and when the rolls 60 and 62 have been brought in proper rotative registration, the bolts 204 are tightened to lock the parts together. The final test of proper registration, is, of course, obtained by examination of the wire emerging from the pressure rolls.

Axial adjustment of the rolls is obtained by affording axial movement of the entire bearing housing 150. Referring to Figs. 13 and 15, the bearing housing is guided during its axial movement by a special key or guideway 206 secured by bolts 208 onto the top of base 182 of the machine. Precision and controlled movement of the bearing is obtained by means of a micrometer screw 210 turned by a head 212 carrying a scale 214. The head is formed integrally with the scale and is much like a control knob, but is flattened at the sides, as is best shown in Fig. 15, thus adapting the same for use with a wrench. Micrometer screw 210 turns in a matingly threaded block 216 (Fig. 15) which is secured in place on the end of base 182 by means of mounting screws 218. The location of block 216 on the machine will be clear from inspection of Fig. 16, and in that figure it will be observed that this block is made small enough in dimension to fit between the teeth of gear 192 and pinion 188. The dial 214 is located outside the teeth of the gear, as will also be clear from Fig. 13.

The micrometer screw 210 is secured to bearing 150 by means of a connecting bolt 220 screwed into a block 222 depending from one end of the bearing where it is mounted in place by screws 224. The head 225 of bolt 220 is received within the head or knob 212, and when the bolt 220 is screwed tightly into block 22, the micrometer screw 210 is locked against rotation. When the axial adjustment is to be changed, the locking screw 220 is first loosened and the micrometer screw is then turned inwardly or outwardly a slight amount, depending upon the desired adjustment. The locking bolt 220 is then again tightened, thus bringing the bearing to proper position and at the same time locking the adjustment of the micrometer screw. It will be understood, of course, that at this time the main bolts mounting the bearing on the base are slack, and after the desired adjustment is obtained, these bolts are tightened. The mounting bolts in question are best shown at 226 in Fig. 11.

The third adjustment is an adjustment of the spacing between the rolls. This determines the degree of deformation of the wire and is a very important adjustment. The two adjustments already described are made only when fitting new rolls into the machine. The present adjustment, however, must often be made when changing from one reel of wire to another, and even in the course of rolling a single reel of wire, due to changes in diameter, hardness and flowability of the wire, and even changes in temperature, because when first starting up the machine the rolls are cold, whereas after a period of operation the rolls are hot. The adjustment is also of value in compensating for the wear of the rolls as they become old.

In the present machine, this adjustment is made possible by pivotally mounting the bearing housing 170 for movement about an axis 230 extending transversely of the axis of roll 62. Axis 230 is located as near as possible to gear 176 and remote from roll 62. It intersects the axis of roll 62. With this location, vertical adjustment of the roll does not change the axial adjustment of the rolls, nor is there any appreciable change in angularity. At the same time, vertical movement of gear 176 is minimized so that there is no appreciable change in the meshing of the gearing. It may be kept in mind that the movement sought by this adjustment is a matter of only one or a few thousandths of an inch.

The adjustment is obtained by means of a pressure screw 232 best shown in Fig. 13, this pressure screw being carried by an extension 234 of the base of bearing housing 170. It will be noted that the screw is located not merely beneath but beyond the rails, thus causing the reactive force at the axis 230 to be a downward force which in turn is taken up on pedestals extending upwardly from the base of the machine. The lower end of the screw 232 bears against a hardened block 236 resting on the base 182 of the machine.

Referring to Figs. 11, 12 and 13, the pressure screw 232 carries an arm 238 at its upper end, and this arm is in turn connected to an adjusting screw 240 the inner end of which is connected to arm 238 by means of a self-aligning bearing 242. The outer end of screw 240 is provided with a scale 244. Adjusting screw 240 is reciprocated by means of a matingly threaded nut 246 (Fig. 11) formed integrally with a sleeve 248 surrounding scale 244. A conveniently manipulatable knurled adjusting handle 250 (Figs. 16 and 17) is secured to sleeve 248. The sleeve and nut are carried in a self-aligning ball bearing 252. It will be understood that on rotating handle 250, the adjusting screw 240 is moved axially and functions to slightly oscillate arm 238, which in turn slightly rotates the pressure screw 232, thereby changing the spacing between the rolls. A very fine adjustment is obtainable because several revolutions of the adjusting handle may be used to move a single division on the scale 244, and a single division on scale 244 results in a change of center to center distance between rolls of only one-thousandth of an inch. This mechanism affords a convenient precision adjustment which is self-locking because of the use of screws.

Bearing housing 170 is pivoted in the following manner. The housing has blocks 254 secured thereto, as by means of bolts 255, these blocks being turned to semi-cylindrical configuration on the lower side to act as the upper half of trunnion bearings (see Figs. 13 and 17). The base 182 of the machine has a pair of bearing pedestals 256 most clearly shown in Figs. 10, 11 and 17, though the upper end of one of the pedestals is visible in Fig. 13. Trunnion bearing blocks 257 are bolted to the upper ends of pedestals 256, as is best shown in Fig. 13. Blocks 257 are turned on their upper side to approximately semi-cylindrical configuration. Cylindrical pins or loose trunnions 230 are disposed between the trunnion bearing blocks 254 and 257. There is a small space between the blocks, they being held apart by the pins 230, as is clearly shown in Fig. 13, and this affords the desired oscillatable mounting of bearing housing 170 about the pins 230.

Pins 230 are held within the bearing blocks 254 and 257 because these blocks are closed at their outer ends, as is best shown at 258 in Figs. 10 and 17. The bearings are held together by a split collar 260, and this is received in a mating groove, as is best shown in Fig. 17. These collars are not relied upon to prevent sideward movement of the main bearing, for that is fixed in location with the aid of a large key or guide 262 best shown in Fig. 13.

The arrangement of the parts is such that the forces developed at adjusting screw 232 and at the pressure rolls, tend to force the outer end of bearing housing 170 downwardly against trunnion pins 230 and pedestals 256. It is for this reason that the bearing housing has its trunnion block 254 acting as the upper half of the bearing, and it is also for this reason that the top of bearing housing 170 is reinforced by a web 264 extending transversely over the bearing housing between the supports for the trunnion bearing blocks 254.

As so far described, it would be impossible to remove the rolls from the machine, because the large massive bearings are in the way of any attempted outward axial movement of the rolls. This will be clear from inspection of Fig. 10. I therefore arrange the machine so that one of the bearings, specifically the upper bearing housing 150, may be tilted or swung bodily out of the way of the lower bearing housing 170. For this purpose, the base of bearing housing 150 is formed with a projection 266 carrying a handle 268. Projection 266 acts as a bearing received between bearing ears 270 formed integrally with base 182. A pin 272 extends through bearings 266 and 270. After preliminarily removing the main attaching bolts 226 and the bolt 220 passing through the axial adjustment screw, handle 268 may be swung downwardly about pin 272, thus swinging the entire bearing housing 150 bodily out of line with bearing housing 170. It will be evident from Fig. 16 that the gearing does not interfere with this movement of bearing housing 150. Fig. 16 also clearly shows a stop projection 274 which is formed integrally with base 182 and which limits the tilting movement of the main bearing. The bearing housing fit at pin 272 is made very loose in order not to interfere with proper seating of the bearing housing on the base when the bearing housing is secured by the bolts 226, and referring to Fig. 11, it will be seen that the holes in bearings 270 are enlarged as indicated at 273, thus providing adequate clearance for this purpose.

Fig. 12 is a view looking toward the lower main bearing housing 170 when the upper main bearing housing has been swung out of the way. The pressure roll 62 may be removed after first preliminarily unscrewing the draw bolt holding the same in place, the head of this draw bolt being indicated at 276 in Figs. 10 and 17. Fig. 12 is also interesting in showing the comparatively tiny nature of the pressure roll 62 contrasted with the end of main shaft 144. This figure also shows a wire guide finger 278 which follows the last of the straightening rolls 32, and which leads the wire up to a point directly between the pressure rolls. Guide finger 278 is made of a lower channel portion and a cover plate 280 screwed thereon. The entire guide finger is carried in a suitable bracket 282 projecting upwardly from the base of the machine. The use of this guide finger is particularly important because it makes it unnecessary to provide the pressure rolls with a special channel for receiving the wire. It may be mentioned that the wire guide 278 should be removed before attempting to remove the pressure roll 62. Fig. 12 also shows a pair of guide wheels 284 which receive the element wire 14 as it leaves the pressure rolls.

I have found, after long experimentation and study of this problem, that best results may be attained by using pressure rolls of very small diameter (but, it goes without saying, not so slender as to break or shear off under the rolling load). More specifically, the pressure rolls should be less than two inches in diameter, and I prefer and recommend rolls which are only one inch in diameter. The permissible roll diameter theoretically varies somewhat with the size (really the impression depths) of the fastener elements being made, and the above specification is applicable to the manufacture of the most common size of slide fastener, that used on brief-cases, windbreakers, or the like. The permissible roll diameter also varies with the ductility or deformability of the metal. A larger roll than above specified might be used with a metal such as aluminum or white metal alloys, which do not harden quickly when deformed.

But the metals actually used for slide fasteners, such as zinc copper or nickel zinc copper alloys, harden quickly as they are deformed. There is benefit in quicker clearance of the parts of the roll from the part of the wire already rolled or formed.

Any discussion of the theory underlying the invention is offered by way of probable explanation and is not intended as a limitation of the invention which, if desired, may be considered to be an empirical discovery independent of underlying theory.

The attaching machine

The attaching machine is shown in a general way in Figs. 8 and 9, but is described in greater detail with reference to Figs. 18 through 22. Referring first to Fig. 21, the punch 98 referred to in connection with Fig. 7 is mounted on a vertically reciprocable ram 290 held normally in elevated position by a compression spring 292. The ram is carried and guided by adjustable ways 294 (Fig. 18) mounted in an upstanding block 296. The return spring 292 is housed within block 296, the upper end of the spring bearing against a stop pin 298, the shank 300 of which is secured in ram 290. The lower end of the spring bears against a part of block 296, as is clearly shown in Fig. 21.

The ram is forced downwardly by oscillation of a ram lever 302 pivotally mounted at 304. The driving force of the lever is applied to the ram through an adjustable stud 306 the lower end of which is preferably provided with the hardened insert 308, (Fig. 21) said insert bearing on the hardened block 310 mounted at the top of the ram. Referring to Figs. 18 and 19, it may be explained that lever 302 is bifurcated to clear the tape 92 and tape drum 130. The spaced depending arms 314 each carry a cam follower roller 316 riding on cams 318 which in turn are mounted on the main drive shaft 320 of the machine. It may be mentioned that the fulcrum pin 304 of ram lever 302 is made readily removable, and when the fulcrum pin is drawn out of the stationary bearings 322 of brackets 324, the ram lever 302 is removable from the apparatus, thereby making the ram and associated parts of the machine accessible. The block 296 is bodily elevatable after removing the screws 326 (Fig. 18), thus affording full access to the punch and feed dogs.

Punch 98 works in a die 328 (Fig. 21), and the punch is provided with generous guides or heels 330 (Fig. 20) which remain in engagement with the die even when the punch is elevated. The punchings or waste metal like the piece 102 shown in Fig. 23, fall through die 328 into a tube or chute 332, and thence into a suitable box beneath the machine.

In describing the process of the invention in connection with Figs. 6 and 7, it was explained that one main operation was the finishing and severing operation performed by the punch 98. The other main operation was the closing of the jaws of the element to clamp the element tightly on the beaded edge of the tape 92. This clamping operation is performed by clamping plates 96, best shown in Fig. 20 of the drawings. It will be seen that these plates are mounted on clamping levers 334 pivoted at 336 and provided at their opposite ends with cam follower rollers 338. These cam follower rollers cooperate with a symmetrically arranged cylindrical cam 340 which is mounted directly on the main drive shaft 320 of the machine. The cam is preferably arranged for positive movement of the clamping levers in both directions. The plates 96 are made separately because they are thin, hardened plates, their vertical dimension being limited by the necessity of operating on one element without interfering with the immediately adjacent element on the tape. It will also be understood that while the range of movement of the clamping plates is small, it is adequate to receive the end-most element of the wire with its jaws in widely spread or divergent condition.

Referring to Fig. 21, the element wire 14 is shown moving from left to right. It is intermittently moved in step by step fashion by means of a feed dog 342 carried at the end of a feed arm 344 pivotally mounted at 346, between bearings 348 projecting upwardly from a slide 350. Pin 352 is carried in the forked end 354 of a feed lever 356, best shown in Fig. 18. Referring to that figure, it will be seen that lever 356 is pivoted at 358 and carries at its remote end a cam follower roller 360 cooperating with a cylindrical cam 362 mounted on the main drive shaft 320 of the machine. Cam follower 360 is held against cam 362 by means of a compression spring 364 carried on a bolt 366. The inner end of the bolt is secured to the frame of the machine, while the outer end carries nuts 368 bearing against the outer end of spring 364. The inner end of the spring bears against a part of lever 356, and this tends to oscillate the lever in a clockwise direction.

Slide 350 is guided by appropriate rails 370. The pins 346 forming a part of the slide are normally pulled toward retracted position by means of pull springs 372 clearly shown in Figs. 18 and 20. This insures retraction of the feed dog despite the existence of play or lost motion in the feed linkage. The amount of movement of the feed dog is constant, and corresponds to the throw of the feed cam 362, and this amount may be made greater than the pitch between successive elements so long as it does not reach twice the pitch, for the extra motion is used up as lost motion behind the head of the next element to be fed. The terminal point of the element depends, therefore, on the location of the feed dog rather than its extent of movement, and this may be varied by varying the location of pin 352 in the forked end 354 of feed lever 356. Referring to Fig. 21, it may be seen that the bifurcations of the feed lever carry adjustable screws 374 bearing against pin 352. The final location of the element to be severed is determined with even greater precision by adjustment of a stop screw 376 the end of which bears against a stop pin 378 inserted in block 296. The adjustment of screw 376 is locked by means of a nut 380. Screw 376 may, if desired, be provided with a handle 384 to facilitate adjustment of the screw, this handle being secured in place by a suitable set screw.

The feed dog 342 is normally urged downwardly against the element wire 14 by means of a pull spring 386 best shown in Fig. 19. The upper end of this spring is carried on a stationary plate 388 secured to bearings 348, while the lower end of pull spring 386 is received on the outer or free end of the stop screw 376 previously referred to. Feed dog 342 is preferably shaped to fit around the element wire so as to help center the same, and also to fit against the head of the element when moving the same. It readily slides backwardly, however, over the head of the next element during retraction of the feed dog.

The element wire is held against return movement by a check dog 390 best shown in Fig. 21. This dog is carried on a spindle 392 mounted in a block 394 disposed beneath the feed dog and stationarily mounted on the frame of the machine by screws 396, as is best shown in Fig. 20. Check dog 390 is inserted in spindle 392 and is locked in position by means of a set screw 398 passing axially through the shaft, as is shown in Fig. 20. Shaft 392 has an upstanding arm 400 to which is connected one end of a pull spring 402 the opposite end of which is connected to the frame of the machine at 404. In this way the check dog is urged in a clockwise direction as viewed in Fig. 21, thus holding it in engagement with the element wire. However, the dog is free to ride upwardly over the heads on the wire, as the wire is advanced by the feed dog. Return movement of the wire is, of course, effectually prevented by the check dog. The feed dog acts on the wire as near as possible to the punch, and the check dog is therefore located outside the tip of the feed dog.

Spacing between stringers is obtained by interrupting the feed of the element wire 14 while continuing the feed of the tape 92. This is done, in the specific machine here shown, by elevating the check dog 390 from the position shown in Fig. 21, to the position shown in Fig. 22. For this purpose the arm 400 of shaft 392 has connected to it a wire link 406 best shown in Fig. 20. Referring to Figs. 18 and 19, it will be seen that the link 406 is connected at its rear end to a pin 408 projecting upwardly from a rod 410 one end of which is bent to crank-shape at 412 where it is connected to the plunger 414 of a solenoid 416. Solenoid 416 is energized through appropriate switch contacts forming a part of the counter 138, the details of which are not material to the present invention and may be found in my copending application Serial No. 214,254, filed June 17, 1938, now Patent No. 2,167,259, issued July 25, 1939, previously referred to. For the present, it is sufficient to say that the counter is operated through a ratchet wheel 418 the dog of which is oscillated through a link 420 extending back toward the main shaft 320 of the machine and there connected on an eccentrically located pin 422 (Fig. 19). The counter is thus responsive to the number of revolutions of the machine, which in turn corresponds to the number of elements attached on the tape, and after a predetermined desired number of elements have been attached, the switch mechanism of the counter energizes solenoid 416, thus elevating the check dog 390 and permitting the element wire 14 to merely vibrate back and forth without feeding any new elements to the tape until the machine has continued rotating an additional number of times corresponding to the desired space between stringers, whereupon the solenoid 416 is again de-energized, check dog 390 is restored to normal position, and the severing and attachment of the elements to the tape proceeds as before until the desired stringer length has again been produced.

The beaded tape 92 is fed upwardly from beneath the machine as is shown in Figs. 19 and 21, it being loosely supplied from a basket. If desired, the basket may be located at a point away from beneath the machine, and in such case the tape is first fed to an elevated guide 424 (Fig. 9) whereupon it is fed downwardly and around another guide beneath the machine and then upwardly through the punching die. The tape is guided through a closely fitting keyhole shaped slot in the die, best shown at 426 in Fig. 20. The tape is tensioned by squeezing it between stationary and movable blocks, the stationary block being indicated at 428 (Fig. 18) and the movable block at 430 (Figs. 18 and 19), said movable block being carried at the end of an arm 432 which is urged against the tape by a tension spring 434. The opposite end of the spring is connected to a screw 436 manually movable by means of a threaded handle 438. Normally the spring is under tension, but when it is necessary to start a new tape into the machine, the tension of the spring may be temporarily relieved by rotating handle 438.

The stringer of tape with elements secured thereto is twisted ninety degrees during its passage from the clamping station upwardly through bifurcated ram lever 302, and is then passed around the tape feed drum 130 (Figs. 18 and 19). This drum is preferably knurled (see Fig. 18) for better frictional engagement with the surface of the tape, the latter being held against the drum by means of a shoe 440 carried in the bifurcated end 442 of a bolt 444 around which a compression spring 446 is coiled. The bolt is carried in the end 448 of a bracket 450 projecting from one of the bearings 324 of the machine. The pressure may be released when desired, and when threading the machine with a new tape, by swinging lever 452, the hub 454 of which is provided with camming bumps 456 adapted to move the bolt and friction shoe against the pressure of spring 446. Tape feed drum 130 is cut away or recessed at one edge, as is indicated at 458 (Fig. 18) in order to clear the elements of the stringer, the operation of the drum being directly upon the web of the tape rather than upon the elements secured thereto.

Tape feed drum 130 is mounted on shaft 460 journalled in a stationary bearing 462 and carrying at its outer extremity a ratchet wheel 136. Ratchet wheel 136 cooperates with a feed pawl 464 (Fig. 19) pivotally mounted at 466 on one end of an oscillatable feed arm 468 which oscillates freely on shaft 460 between ratchet wheel 136 and bearing 462. The enlarged hub of feed arm 468 carries an oppositely directed arm 470 the outer end of which is forked and pivotally connected to a connecting rod 472. The lower end of connecting rod 472 is carried on an eccentric 474 mounted on the end of the main shaft 320 of the machine (though inside of the crank pin 422 for the counter). The proportioning of the parts is made such that the tape is advanced step by step an amount equal to the desired spacing between successive elements on the tape. Return movement of the feed drum is prevented by a holding dog 476 pivoted on bracket 462 at 478. The dogs 464 and 476 are held against the ratchet wheel by pull springs 480 and 482.

It will be seen from the above description and from the drawings that the severing punch, clamping jaws, tape feed pawl, wire feed dog, and counter are all operated in a simple and direct manner by the single main cam shaft 320, and that the reciprocating parts are kept short in stroke, and small and light compared, for example, to the reciprocating head of an ordinary punch press. The machine is therefore adapted for very high speed operation.

The main drive shaft 320 carries a pulley 484, (Fig. 18), and this is driven by a belt running to an electric motor (not shown) mounted on the bottom of the base 486 of the machine. The motor and belt are concealed from view in Fig. 9 by a guard plate 488. The shaft 320 is preferably also provided with a fly wheel 490, which may be used when adjusting the machine, as a hand-wheel.

*Advantages*

It is believed that the method of my invention, as well as the construction and operation of a preferred form of apparatus for practicing the invention, and the many advantages thereof, will be understood from the foregoing detailed description thereof. Some of these advantages are reviewed hereinafter. The embryo elements are made in large quantity and at high speed in a piece of apparatus especially designed for that purpose, and are finished, severed and attached in another piece of apparatus. This leads to greater flexibility in manufacture and in meeting the requirements of customers and leads to greater efficiency of operation, for the rolling mill may operate continuously and without as many interruptions as are required in connection with the attaching machine. The number of machines may be properly adjusted in relation to the relative speeds thereof. Because the heavy work is done in the rolling mill, the attaching machine is a light-duty piece of apparatus and may be operated at very high speed. A speed several times the speed of any other slide fastener apparatus of which I am aware is readily obtainable. The rolling mill, however, is even faster, and this is all the more unusual because this is the heavy-duty part of the apparatus. The rolling mill may be operated at a speed corresponding to the manufacture of thousands of elements per minute. If the element wire were being formed in a reciprocating press, it is manifest that the press could not be operated at such an extremely high speed. The shaft would have to turn at the same high speed, whereas the mill shaft turns only a few hundred R. P. M. The output of the rolling mill is even greater than would be indicated by the above figures, because, as has previously been mentioned, there is no interruption of the rolling mill at the time that the attaching machine is interrupted to produce the spacing between stringers. For this reason it is readily possible to supply element wire for four or five attaching machines from a single rolling mill.

With the present invention it is possible to form relatively broad flat elements of conventional character from simple uniform round wire stock, thus minimizing the cost of the raw material. The amount of scrap or waste is reasonably small because the metal connecting the successive elements is reduced to a comparatively thin web. The element wire is formed throughout a continuous length or reel of stock, and reels carrying a mile or more of element wire are readily and conveniently handled by the above described apparatus.

The formation of the element wire in a rolling mill results in a substantially uniform pitch or spacing of the elements along the wire, and this is important for the production of a smooth running slide fastener. This uniformity of pitch is obtained while using ordinary commercial round wire stock which is subject to variations in diameter, hardness and flowability. The extensive deformation or mutilation of the wire in the rolling mill is accompanied by a stretch or elongation, but this elongation is accommodated by using exceedingly small pressure rolls. These also have the advantage of producing a comparatively good shaping of the complex embryo elements, and of reducing the force between the rolls. A larger diameter roll would tend to insure absolute uniformity of pitch but raises other difficulties. The small diameter roll produces a very nearly uniform pitch which is adequate for making a smooth-running slide fastener. The pitch is very uniform indeed compared with the troublesome irregular pitch obtained when coining elements under the best of conditions in a reciprocating press. The element wire is formed in a single passage through the rolls, thus avoiding difficulties of registration which would arise because of successive elongations if the stock were passed through successive rolls. The rolling mill is so arranged that despite the tiny size of the rolls, they are carried in massive shafts and bearings and are driven by massive gearing. Rotational and axial adjustment of the rolls, as well as convenient precision adjustment of the spacing between rolls are all provided for.

The separation of the element manufacture into two parts as here disclosed eliminates the problem of hoppering and assorting a mass of loose elements, this being a step which has always been troublesome because of the rather complex unsymmetrical nature of the elements with their divergent jaws. At the same time, the disadvantages of attempting to perform all of the necessary operations in a single machine are avoided.

This application is a continuation in part of my co-pending applications Serial No. 750,609, filed October 30, 1934, and entitled "Method and apparatus for making slide fasteners," and Serial No. 79,047, filed May 11, 1936, and entitled "Manufacture of slide fasteners."

It will be apparent that while I have shown and described my invention in a preferred form, many changes and modifications may be made without departing from the spirit of the invention defined in the following claims.

I claim:

1. The method of making interlockable elements for a slide fastener, which includes the step of preliminarily pressing and thereby deforming, without cutting, the entire length of a long continuous strip of uniform wire stock to form a connected series of embryo fastener elements therefrom, each of said embryo elements comprising a solid embryo head and widely divergent embryo jaws, the head being narrow and adapted to interlock with the heads of adjacent elements when the elements are mounted on the slide fastener, and the embryo jaws diverging outwardly from the embryo head, said connected elements being arranged longitudinally of the strip in end to end relation with the divergent embryo jaws pointing generally toward one end of the strip, there being substantially no waste material outside the embryo jaws of the elements.

2. The method of making interlockable elements for a slide fastener, which includes the step of preliminarily pressing and thereby deforming the entire length of a long continuous strip of uniform wire stock to form an integrally connected series of embryo fastener elements therefrom, each of said embryo elements comprising a solid embryo head and widely divergent embryo jaws, the head being narrow and adapted to interlock with the heads of adjacent elements when the elements are mounted on the slide fastener, and the embryo jaws diverging outwardly from the embryo head, and said connected embryo elements being arranged longitudinally of the strip in end to end relation with the embryo jaws pointing toward one end of the strip, and at the same time pressing the connecting material between the embryo heads and jaws of the successive embryo elements down to a thin web of material adapted to be subsequently punched away for completion and separation of the elements.

3. The method of manufacturing a slide fastener wire, which includes preliminarily running a continuous uniform solid wire between a single pair of rotating pressure coining rolls, the surfaces of which are shaped negatively to portions of the desired fastener elements, and thereby forming in a single rolling coining operation a relatively broad flat wire having a continuous series of projections uniformly spaced on one side of the wire, and corresponding recesses uniformly spaced on the opposite side of the wire for the heads of the fastener elements, the wire being wider than the projections and recesses and the marginal portions thereof acting to provide material for the formation of spread jaws when the elements are severed from the wire, the coining impressions in the rolls being such that the slide fastener wire is adapted to be severed into a series of elements arranged longitudinally of the wire and all pointing in the same direction.

4. The method of manufacturing embryo slide fastener elements which includes preliminarily running a continuous uniform solid wire between a single pair of rotating pressure coining rolls the surfaces of which are shaped negatively to the desired embryo elements and thereby forming in a single rolling coining operation a continuous series of relatively broad flat connected embryo slide fastener elements, each of said elements having an embryo head with angularly spread embryo jaws connected thereto, and said embryo heads being uniformly spaced along the wire and each having a projection and a recess, the coining impressions in the rolls being such that the coined embryo elements are arranged longitudinally of the wire and all point in the same direction.

5. The method of manufacturing embryo slide fastener elements, which includes preliminarily running a continuous uniform round metallic wire between rotating pressure rolls the surfaces of which are shaped negatively to the desired embryo elements, and thereby forming a continuous series of relatively broad flat connected embryo slide fastener elements, each of said embryo elements having an embryo head with spread embryo jaws connected thereto, said embryo head having a projection and a recess, and said embryo elements being connected by a web of metal between the spread embryo jaws.

6. The method of manufacturing a slide fastener wire, which includes preliminarily running a continuous uniform wire between rotating pressure rolls, the surfaces of which are shaped negatively to portions of the desired fastener elements, and at intervals measuring the rolled wire and adjusting the spacing between the rolls to compensate for changes in the diameter and deformability of the wire being supplied to the rolls in order to maintain uniformity in the resulting slide fastener wire.

7. In the manufacture of slide fasteners, the method which includes pressing, without cutting, a continuous wire stock in order to deform the same into a connected series of embryo fastener elements, each of said elements comprising an interlockable embryo head portion and divergent embryo jaw members, the embryo head of each member being connected to the divergent embryo jaws of the adjacent member, and reeling said stock, whereby the stock may be stored and thereafter unreeled as needed to fill particular orders for slide fasteners.

8. In the manufacture of slide fasteners, the method which includes pressing, without cutting, a continuous round wire stock in order to deform the same into a connected series of embryo fastener elements, each of said elements comprising an interlockable embryo head portion and spread embryo jaw members, the embryo head of each member being connected to the spread embryo jaws of the adjacent member with the elements arranged end to end, the embryo head and spread jaws of the element being wider than the diameter of the round wire stock, and reeling said stock with the embryo elements head first, whereby the formed stock may be stored and thereafter unreeled jaw first as needed to fill particular orders for slide fasteners.

9. The method of manufacturing embryo slide fastener elements which includes preliminarily running a continuous uniform wire between rotating pressure rolls the surfaces of which are shaped negatively to the desired embryo elements and thereby forming a continuous series of connected embryo slide fastener elements, each of said elements having an interlockable embryo head with angularly spread embryo jaws connected thereto, said elements being connected end to end with the embryo head of one element connected to the angularly spread embryo jaws of the next element, the rolls being rotated in proper direction to form the embryo elements pointing head first, and thereupon reeling the wire with the embryo elements pointing nead first, for storage and subsequent utilization.

10. The method of manufacturing embryo slide fastener elements, which includes preliminarily running a continuous round metallic wire between rotating pressure rolls the surfaces of which are shaped negatively to the desired embryo elements and thereby forming a continuous series of connected embryo slide fastener elements, each of said elements having an interlockable embryo head with spread embryo jaws connected thereto, said elements being connected end to end with the embryo head of one element connected to the open embryo jaws of the next element, the rolls being rotated in proper direction to form the embryo elements pointing head first, the embryo head and open jaws being wider than the diameter of the round wire stock, permitting elongation of the wire as it is formed between the rools by freeing the wire from the rolls promptly after forming the same, and thereupon reeling the wire with the embryo elements pointing head first for storage and subsequent utilization.

11. In the manufacture of slide fasteners, the method which includes pressing a continuous round wire stock in order to deform the same into a connected series of embryo fastener elements, each of said embryo elements comprising an interlockable embryo head portion and divergent embryo jaw members, the embryo head of each element being connected to the divergent embryo jaws of the adjacent element by a thin web of metal, with the embryo elements arranged end to end, the embryo head and jaws of the embryo element being wider than the diameter of the round wire stock, reeling said stock, whereby the formed stock may be stored and thereafter unreeled as needed to fill orders for slide fasteners, and thereafter severing successive elements from the formed wire by punching away the thin web of metal to form the finished elements.

12. The method of manufacturing slide fasteners, which includes preliminarily running a continuous uniform wire between rotating pressure rolls, the surfaces of which are shaped negatively to portions of the desired fastener elements, reeling the wire with the embryo elements pointed head first, thereafter unreeling the wire so that the embryo elements point in opposite direction, feeding the same intermittently toward a tape, severing successive elements one after another from the strip while shaping element jaws and clamping element jaws of one element after another on the tape, and intermittently feeding the tape in a longitudinal direction.

13. In the manufacture of a stringer for a slide fastener, said stringer comprising a series of elements secured along one edge of a tape, the method which includes pressing and thereby deforming, without cutting, a continuous wire to form an integrally connected series of embryo fastener elements therefrom, each of said elements comprising an interlockable solid embryo head portion and angularly spread embryo jaws, the spread embryo jaws being wider than the original stock, said connected embryo elements being arranged longitudinally of the strip in end to end relation with the divergent embryo jaws pointing generally toward one end of the strip, intermittently feeding the continuous pressed wire with the elements pointing jaw first toward a tape, severing successive elements one after the other from the wire and clamping element jaws of one element after another on the tape, and intermittently feeding the tape.

14. The method of making a stringer for a slide fastener which includes pressing and thereby deforming, without cutting, a continuous strip of stock to form a connected series of embryo fastener elements, each of said elements comprising an interlockable embryo head portion and angularly spread embryo jaws, the embryo head of each member being connected to the spread embryo jaws of the adjacent member, reeling said stock with the embryo elements pointing head first, thereafter unreeling said stock with the embryo elements pointing jaw first, and feeding the same intermittently toward a tape, severing successive elements one after another from the strip and clamping element jaws of one element after another on the tape, and intermittently feeding the tape in a longitudinal direction.

15. The method of making a stringer for a slide fastener, which includes pressing and thereby deforming, without cutting, a continuous strip of stock to form a connected series of embryo fastener elements therefrom, each of said elements comprising an interlockable embryo head portion and spread embryo jaws, reeling said stock, thereafter unreeling said stock and feeding the same intermittently toward a tape, intermittently feeding the tape in a longitudinal direction, clamping the jaws of the first element on the tape and severing the first element from the next succeeding element, the severing and clamping operations being performed at about the same time, thereupon advancing the tape and stock, and so on.

16. The method of making a stringer for a slide fastener, which includes pressing and thereby deforming, without cutting, a continuous strip of stock to form a connected series of embryo fastener elements therefrom, each of said elements comprising an interlockable embryo head portion and spread embryo jaws, the embryo head of each member being connected to the spread embryo jaws of the adjacent member, reeling said stock with the embryo elements pointing head first, thereafter unreeling said stock with the embryo elements pointing jaw first and feeding the same intermittently toward a tape, intermittently feeding the tape in a longitudinal direction, clamping the jaws of the first element on the tape and severing the material connecting the first element to the next succeeding element, the severing and clamping operations being performed at about the same time, thereupon advancing the tape and the stock, and so on.

17. The method of making a stringer for a slide fastener, which includes deforming, without cutting, continuous round wire stock to form a connected series of embryo fastener elements therefrom, each of said elements comprising an interlockable embryo head portion and spread embryo jaws, the embryo head of each element being connected to the embryo jaws of the adjacent element, reeling said deformed wire with the embryo elements pointing head first, thereafter unreeling said wire with the embryo elements pointing jaw first and feeding the same intermittently toward the beaded edge of a tape, intermittently feeding the tape in a longitudinal direction, clamping the jaws of the first element around the bead of the tape and severing the material connecting the first element to the next succeeding element, the severing and clamping operations being performed at about the same time, thereupon advancing the tape and feeding the wire to bring the next element in engagement therewith, and so on.

18. In the manufacture of a stringer for a slide fastener, said stringer comprising a series of elements secured along one edge of a tape, the method which includes pressing and thereby deforming, without cutting, a continuous strip of narrow stock to form an integrally connected series of embryo fastener elements therefrom, each of said elements comprising an interlockable solid embryo head portion and widely spread embryo jaws, the spread embryo jaws being wider than the original stock, said connected embryo elements being arranged longitudinally of the strip in end to end relation with the divergent embryo jaws pointing generally toward one end of the strip, intermittently feeding the tape, intermittently feeding the continuous strip of pressed stock with the embryo elements pointing jaws first, clamping the jaws of the first element on the tape and thereafter severing the first element from the succeeding element, and thereupon again feeding the tape and strip preparatory to clamping the next element in place on the aforesaid tape.

19. In the manufacture of a stringer for a slide fastener, said stringer comprising a series of elements secured along one edge of a tape, the method which includes pressing and thereby deforming a continuous strip of narrow stock to form an integrally connected series of embryo fastener elements arranged end to end, each of said embryo elements comprising an interlockable solid embryo head portion and widely spread embryo jaws, the connecting material between the embryo heads and spread jaws of the successive embryo elements being pressed down to a thin web of material adapted to be punched away for completion and separation of the elements, intermittently feeding a tape, intermittently feeding said strip toward the tape with the embryo elements jaws first, clamping the jaws of the first element on the tape and at about the same time punching away the thin web of material connecting the said first element to the succeeding elements, and thereupon again feeding the tape and strip preparatory to clamping the next element on the aforesaid tape.

20. The method of making a stringer for a slide fastener which includes pressing and thereby deforming, without cutting, a continuous round wire stock to form a connected series of embryo fastener elements therefrom, each of said embryo elements comprising an interlockable embryo head portion and spread embryo jaws, the embryo head of each embryo element being connected to the embryo jaws of the adjacent embryo element by a thin web of connecting material, reeling said deformed wire with the embryo elements pointing head first, thereafter unreeling said wire with the embryo elements pointing jaw first and feeding the same intermittently toward the beaded edge of a tape, intermittently feeding the tape in a longitudinal direction, clamping the jaws of the first element around the bead of the tape, thereafter punching away the web of material connecting the first element to the next succeeding element in order to sever and finish shaping the first element, and thereupon advancing the tape and feeding the punched wire to bring the jaws of the next element into engagement with the tape, and so on.

21. A step product in the manufacture of slide fasteners, said step product comprising a long wire made up of a continuous integrally connected series of embryo fastener elements, each of said embryo elements comprising a solid embryo head portion and widely divergent embryo jaws, and said connected embryo elements being arranged longitudinally of the strip in end to end relation with the embryo jaws pointing toward one end of the strip, the embryo head of each embryo element being connected to the spread embryo jaws of the adjacent embryo element by a thin web of material which fills the space within said spread of jaws and head, and which is adapted to be punched away for completion of the shaping of the outline of the elements and for separation of the elements, said web of material having a thickness only a small fraction of the thickness of the element.

22. A step product in the manufacture of slide fasteners, said step product comprising a reel of wire the entire length of which is pressed, without cutting, and thereby deformed into a connected series of embryo slide fastener elements, each of said elements comprising an interlockable embryo head portion and spread embryo jaws, the embryo head of each embryo element being connected to the spread embryo jaws of the adjacent embryo element with the embryo elements arranged end to end and longitudinally of the wire, said embryo elements all pointing in the same direction and being reeled in such direction that the embryo elements point jaw first when unreeled from the reel.

23. A step product in the manufacture of slide fasteners, said step product comprising a reel of wire the entire length of which is pressed to form a connected series of embryo slide fastener elements, each of said embryo elements comprising an interlockable embryo head portion and divergent embryo jaws, the embryo head of each embryo element being connected to the divergent embryo jaws of the adjacent embryo element by means of a thin web of metal which fills the space within said spread jaws and head, and which is adapted to be punched away, the embryo elements being arranged end to end and longitudinally of the wire, said embryo elements all pointing in the same direction and being reeled in such direction that the embryo elements point jaws first when unreeled from the reel.

24. Apparatus for the manufacture of slide fasteners, said apparatus comprising a reel to supply a continuous wire, means to press and thereby deform, solely by pressing and without cutting, the wire into a connected series of embryo fastener elements, each of said elements comprising an interlockable embryo head portion and spread embryo jaws, and a reel on which the formed wire is wound as fast as it is formed, for storage until needed.

25. Apparatus for the manufacture of slide fasteners, said apparatus comprising means to supply a continuous round wire, means to squeeze and thereby deform the round wire into a connected series of embryo fastener elements, each of said elements comprising an interlockable embryo head portion and spread embryo jaws, the embryo head of each embryo element being connected to the spread embryo jaws of the adjacent embryo element with the embryo elements arranged end to end longitudinally of the wire, and a reel on which the formed wire is wound as fast as it is formed, for storage until needed, the wire deforming means being so shaped as to form the embryo elements with the embryo heads pointing toward the reel on which the formed wire is being wound.

26. Apparatus for manufacturing a slide fastener wire or connected series of embryo slide fastener elements, each of said elements having an embryo head with spread embryo jaws connected thereto, said embryo head having a projection and a recess, and said embryo elements being connected between the spread embryo jaws, said apparatus comprising pressure rolls, one having a periphery formed negatively to one side of the slide fastener wire, and the other having a periphery formed negatively to the other side of the slide fastener wire, and means to support and synchronously rotate the rolls in mating registration.

27. Apparatus for transforming a smooth wire into an element wire or a connected series of embryo slide fastener elements, each of said embryo elements having a projection and a recess, said apparatus comprising two small diameter pressure rolls having peripheries formed generally negatively to the desired element wire, the roll impressions being such as to intermittently compress the wire at the middle to spread the wire at regularly spaced points along the wire and to thereby force the metal outwardly to form angularly projecting embryo jaw ends.

28. Apparatus for manufacturing a slide fastener wire or connected series of embryo slide fastener elements, each of said embryo elements having an embryo head with spread embryo jaws connected thereto, said embryo head having a projection and a recess, and said embryo elements being connected between the spread embryo jaws, said apparatus comprising two small-diameter pressure rolls, one having a periphery formed negatively to one side of the slide fastener wire, and the other having a periphery formed negatively to the other side of the slide fastener wire, said rolls having a diameter of less than two inches and preferably having a diameter of only one inch or less.

29. Apparatus for manufacturing a slide fastener wire or connected series of embryo slide fastener elements, each of said embryo elements having an embryo head with spread embryo jaws connected thereto, said embryo head having a projection and a recess, and said embryo elements being connected between the spread embryo jaws, said apparatus comprising two small-diameter pressure rolls, one having a periphery formed negatively to one side of the slide fastener wire, and the other having a periphery formed negatively to the other side of the slide fastener wire, said rolls having a diameter of less than two inches and preferably having a diameter of only one inch or less, said rolls being synchronously rotated under high pressure and high torque by means including shafts, support bearings, and driving gears, all of which are substantially larger in diameter than the diameter of the pressure rolls, and sufficiently massive to provide such pressure between the rolls as to deform a uniform wire into the desired slide fastener wire in a single passage through the rolls.

30. Apparatus for the manufacture of slide fastener wire or a connected series of embryo slide fastener elements, each of said embryo elements having an embryo head with spread embryo jaws connected thereto, said embryo head having a projection and a recess, and said embryo elements being connected between the spread embryo jaws, said apparatus comprising small-diameter pressure rolls supported on sturdy large-diameter shafts, the shafts being in parallel relation and larger in diameter than the pressure rolls, and sufficiently massive to provide such pressure between the rolls as to deform a uniform wire into the desired slide fastener wire in a single passage through the rolls.

31. Apparatus for the manufacture of slide fastener wire or a connected series of embryo slide fastener elements, each of said embryo elements having an embryo head with spread embryo jaws connected thereto, said embryo head having a projection and a recess, and said embryo elements being connected between the spread embryo jaws, said apparatus comprising small-diameter pressure rolls supported on sturdy large-diameter shafts, the pressure rolls being mounted at adjacent ends of the shafts, and the shafts being parallel to one another and extending in opposite directions away from the pressure rolls, said rolls having a small diameter of the order of one inch and said shafts being sufficiently massive to provide such pressure between the rolls as to deform a uniform wire into the desired slide fastener wire in a single passage through the rolls.

32. Apparatus for the rolling of slide fastener wire, or a connected series of embryo slide fastener elements each having a projection and a recess, said apparatus comprising a frame, relatively large massive bearings mounted on said frame in approximately end to end relation but one being offset relative to the other, massive roll-support shafts in said bearings, said shafts extending in opposite directions and terminating between the bearings, pressure rolls mounted in the ends of said large diameter shafts and arranged to be rolled in synchronism with one another by the shafts, one of said rolls having a periphery formed negatively to one side of the slide fastener wire, and the other having a periphery formed negatively to the other side of the slide fastener wire, a countershaft extending through said frame offset from the bearings, gearing of generous proportions gearing said countershaft to said roll shafts, and means for driving the countershaft, said shafts and gearing being sufficiently massive to provide such pressure between the rolls as to deform a uniform wire into the desired slide fastener wire in a single passage through the rolls.

33. Apparatus for the rolling of slide fastener wire or a connected series of embryo slide fastener elements, each of said embryo elements having an embryo head with spread embryo jaws connected thereto, said embryo head having a projection and a recess, and said embryo elements being connected between the spread embryo jaws, said apparatus comprising a frame, relatively large massive bearings mounted on said frame in end to end relation, one being elevated slightly relative to the other, massive roll-support shafts in said bearings, said shafts extending in opposite directions and terminating between the bearings, small-diameter pressure rolls mounted in the ends of said large-diameter shafts and arranged to be rolled in synchronism with one another by the shafts, one of said rolls having a periphery formed negatively to one side of the slide fastener wire, and the other having a periphery formed negatively to the other side of the slide fastener wire, a countershaft extending through said frame beneath the bearings, gearing of generous proportions gearing said countershaft to said roll shafts, and means for driving the countershaft, said shafts and gearing being sufficiently massive to provide such pressure between the rolls as to deform a uniform wire into the desired slide fastener wire in a single passage through the rolls.

34. Apparatus for manufacturing a slide fastener wire, or a connected series of embryo fastener elements, said apparatus comprising pressure rolls, one having a periphery formed negatively to one side of the slide fastener wire, and the other having a periphery formed negatively to the other side of the slide fastener wire, means to support and synchronously rotate the rolls in mating registration, and a conveniently manipulatable self-locking precision adjustment means affording a very fine adjustment of the spacing between the rolls.

35. Apparatus for manufacturing a slide fastener wire, or a connected series of embryo slide fastener elements, said apparatus comprising pressure rolls, one having a periphery formed negatively to one side of the slide fastener wire, and the other having a periphery formed negatively to the other side of the slide fastener wire, means to support and synchronously rotate the rolls in mating registration, conveniently manipulatable precision screw adjustment means affording adjustment of the spacing between the rolls, and a scale for indicating the movement of the adjusting screw.

36. Apparatus for manufacturing a slide fastener wire, or a connected series of embryo slide fastener elements, said apparatus comprising pressure rolls, one having a periphery formed negatively to one side of the slide fastener wire, the other having a periphery formed negatively to the other side of the slide fastener wire, means to support and synchronously rotate the rolls in mating registration, means affording axial movement of one of said rolls, a precision adjustment means for moving said roll in order to bring the rolls into axial registration, means affording transverse movement of one of the rolls in order to vary the spacing between the rolls, and a precision adjustment means for moving said roll to vary the spacing between the rolls.

37. Apparatus for the manufacture of a slide fastener wire, said apparatus comprising small-diameter pressure rolls supported at the adjacent ends of sturdy large-diameter shafts, one of said rolls having a periphery formed negatively to one side of the slide fastener wire, and the other having a periphery formed negatively to the other side of the slide fastener wire, the shafts extending in opposite directions away from the pressure rolls and being carried in large massive bearings mounted on a base, a countershaft extending beneath the bearings, gearing of generous proportions outside said bearings for gearing said countershaft to said roll shafts, and precision screw adjustment means affording adjustment of the spacing between the rolls during operation of the apparatus.

38. A rolling mill for the manufacture of a slide fastener wire, or a connected series of embryo slide fastener elements, said mill comprising pressure rolls supported at the adjacent ends of sturdy large-diameter shafts, one of said rolls having a periphery formed negatively to one side of the slide fastener wire, and the other having a periphery formed negatively to the other side of the slide fastener wire, the shafts extending in opposite directions away from the pressure rolls and being carried in large massive bearings mounted on a base, a countershaft extending collaterally of the bearings, gearing of generous proportions outside said bearings for gearing said countershaft to said roll shafts, means affording transverse movement of one of said bearings to vary the spacing between the rolls, readily manipulatable precision adjustment means for moving said bearing in order to adjust the spacing between the rolls, and a scale for indicating the movement of the adjustment means.

39. Apparatus for the manufacture of a slide fastener wire, said apparatus comprising small-diameter pressure rolls supported at the adjacent ends of sturdy large-diameter shafts, one of said rolls having a periphery formed negatively to one side of the slide fastener wire, and the other having a periphery formed negatively to the other side of the slide fastener wire, the shafts extending in opposite directions away from the pressure rolls and being carried in large massive bearings mounted on a base, a countershaft extending beneath the bearings, gearing of generous proportions outside said bearings for gearing said countershaft to said roll shafts, and means affording vertical adjustment of the lower pressure roll in order to vary the spacing between the rolls, said means including horizontal trunnions for the bearing, precision screw adjustment means for supporting said bearing in desired position, and a scale for indicating the movement of the adjusting screw.

40. Apparatus for manufacturing a slide fastener wire, or a connected series of embryo slide fastener elements, said apparatus comprising pressure rolls, one having a periphery formed negatively to one side of the slide fastener wire, the other having a periphery formed negatively to the other side of the slide fastener wire, said rolls having tapered shanks, and means to support and synchronously rotate the rolls in mating registration, said means including sturdy, large-diameter shafts bored to receive the tapered shanks of the rolls, the shafts extending in opposite directions away from the pressure rolls and being carried in large, massive bearings mounted on a base, a countershaft extending collaterally of the bearings, gearing of generous proportions outside said bearings for gearing said countershaft to said roll shafts, means affording axial movement of one of said bearings, and a precision adjustment means for moving said bearing in order to bring the rolls into axial registration.

41. Apparatus for transforming a round wire into an element wire, or connected series of embryo slide fastener elements, each of said embryo elements having an embryo head with spread embryo jaws connected thereto, said embryo head having a projection and a recess and said embryo elements being disposed longitudinally of the wire and connected by a web of metal between the spread embryo jaws, said apparatus comprising two small-diameter pressure rolls having peripheries formed generally negatively to the desired element wire, the roll impressions at the head of the embryo element being such as to confine and shape the external configuration of the head, and the roll impressions at the embryo jaws of the element being such as to compress the wire at the middle to form the desired web and to squeeze the metal outwardly to form the embryo jaws, the roll impression around the embryo jaws being substantially enlarged in order to accommodate variations in the round wire stock.

42. Apparatus for transforming a round wire into an element wire, or connected series of embryo slide fastener elements, each of said embryo elements having an embryo head with spread embryo jaws connected thereto, said embryo head having a projection and a recess and said embryo elements being disposed longitudinally of the wire and connected by a web of metal between the spread embryo jaws, said apparatus comprising two small-diameter pressure rolls having peripheries formed generally negatively to the desired element wire, the roll impressions at the embryo head of the embryo element being such as to confine and shape the external configuration of the embryo head, and the roll impressions at the embryo jaws of the embryo element being such as to compress the wire at the middle to form the desired web and to squeeze the metal outwardly to form the embryo jaws, the roll impression around the embryo jaws being substantially enlarged in order to accommodate variations in the round wire stock without causing changes in the pitch of the element wire, the maximum breadth of said element wire being defined, however, by side walls of the roll impression in order to keep the width of the element wire at the points of maximum breadth within a desired limit.

43. Apparatus for the manufacture of slide fasteners, out of a reel of preliminarily pressed wire, said wire being so pressed and thereby deformed as to form a connected series of embryo fastener elements, each of said embryo elements comprising an interlockable embryo head portion and divergent embryo jaws, said apparatus comprising a support for rotatably supporting said reel, means to intermittently feed the wire in a longitudinal direction, and means to successively sever the elements from the wire, said means including a die and a punch so shaped as to cut around the end of the head of the endmost element being severed, and at the same time to cut around the inside of the spread jaws of the next element in order to shape the entire inside surface of the jaws, in a single stroke of the punch.

44. Apparatus for the manufacture of slide fasteners, said apparatus comprising means to feed an element wire in longitudinal direction toward a tape extending transversely of the element wire, means to feed the tape longitudinally, a punch arranged for reciprocation in the direction of the tape at a point near the tape and transversely of the plane of the jaws of the element wire, said punch being so shaped as to shape the outline of the end of the head of the endmost element being severed from the element wire, and at the same time to cut around the inside of the spread jaws of the next element in order to properly shape the entire inside surface of the jaws, in a single stroke of the punch, and oppositely movable clamping jaws for clamping the jaws of an element on the beaded edge of the tape.

45. Apparatus for the manufacture of slide fasteners, out of a reel of preliminarily pressed wire, said wire being so pressed and thereby deformed as to form a connected series of embryo fastener elements, each of said embryo elements comprising an interlockable embryo head portion and spread embryo jaws, the embryo head of each embryo element being connected to the spread embryo jaws of the adjacent embryo element with the embryo elements arranged end to end and the embryo jaws pointing in the direction of the wire leaving the reel, said apparatus comprising a support on which said reel is rotatably mounted, means to intermittently feed the wire in a longitudinal direction, means to sever the endmost element from the wire, said means including a die and a punch so shaped as to cut around the end of the head of the endmost element being severed, and at the same time to cut around the inside of the spread jaws of the next element in order to shape the entire inside surface of the jaws, in a single stroke of the punch, means to intermittently feed a tape in a longitudinal direction, and means to clamp the jaws of the endmost element to the tape as it is severed from the wire.

46. Apparatus for the manufacture of slide fasteners, out of a reel of preliminarily pressed wire, said wire being so pressed and thereby deformed as to form a connected series of embryo fastener elements, each of said embryo elements comprising an interlockable embryo head portion and divergent embryo jaws, the embryo head of each embryo element being connected by means of a thin web of metal to the divergent embryo jaws of the adjacent embryo element with the embryo elements arranged end to end and the embryo jaws pointing in the direction of the wire leaving the reel, said apparatus comprising a support for rotatably supporting said reel, means to intermittently feed the wire in a longitudinal direction, means to punch away the thin web of metal in order to sever the endmost element from the wire, said means including a die and a punch so shaped as to cut around the end of the head of the endmost element being severed, and at the same time to cut around the inside of the spread jaws of the next element in order to shape the entire inside surface of the jaws, in a single stroke of the punch, means to intermittently feed a tape in a longitudinal direction, and means to clamp the jaws of the endmost element to the tape as it is severed from the wire.

47. Apparatus for the manufacture of slide fasteners, said apparatus comprising means to feed an element wire in longitudinal direction toward a tape extending transversely of the element wire, means to feed the tape longitudinally, a punch arranged for reciprocation in the direction of the tape at a point immediately adjacent the tape and transversely of the plane of the jaws of the element wire, oppositely movable clamping jaws for clamping the jaws of an element on the beaded edge of the tape, a counter, and a single cam shaft provided with appropriate cams for operating the wire feed means, the tape feed means, the punch, the clamping jaws, and the counter.

48. Apparatus for the manufacture of slide fasteners, said apparatus comprising means to feed an element wire in longitudinal direction toward a tape extending transversely of the element wire, means to feed the tape longitudinally, a punch arranged for reciprocation in the direction of the tape at a point close to the tape and transversely of the plane of the jaws of the element wire, oppositely movable clamping jaws for clamping the jaws of an element on the beaded edge of the tape, and a single cam shaft provided with appropriate cams for operating the wire feed means, the tape feed means, the punch, and the clamping jaws, all of the aforesaid reciprocating parts being small and light and short in stroke, whereby the apparatus may be operated at exceedingly high speeds.

49. Apparatus for the manufacture of slide fasteners from an element wire comprising a connected series of embryo fastener elements, a feed dog to intermittently feed the element wire in a longitudinal direction, a check dog for preventing return movement of the wire, means to intermittently feed a tape in a longitudinal direction, means to sever the elements from the wire and to attach them to the tape, means for driving the feed dog, the tape feed means and the severing and attaching means, a counter, and means responsive to said counter for operating on one of said dogs and thereby making said combination of dogs unable to cause feed of the element wire, so as to produce a blank space between stringers.

50. Apparatus for the manufacture of slide fasteners, said apparatus comprising a reciprocable feed dog to intermittently feed an element wire in a longitudinal direction, a check dog for preventing return movement of the wire, means to intermittently feed a tape in a longitudinal direction, means to sever the elements from the wire and to attach them to the tape, means for driving the feed dog, the tape feed means and the severing and attaching means, a counter, and means responsive to said counter for moving the check dog out of engagement with the wire in order to interrupt the feed of the wire so as to produce a blank space between stringers, without necessitating interruption of the reciprocation of the feed dog.

51. Apparatus for the manufacture of slide fasteners, said apparatus comprising means to feed an element wire in longitudinal direction toward a tape extending transversely of the element wire, means to feed the tape longitudinally, a punch arranged for reciprocation in the direction of the tape at a point close to the tape and transversely of the plane of the jaws of the element wire, oppositely movable clamping jaws for clamping the jaws of an element on the beaded edge of a tape, the means to feed the element wire comprising a feed dog the working end of which engages the wire at a point just ahead of and very close to the aforesaid punch.

52. Apparatus for the manufacture of slide fasteners, out of a heavy reel of slide fastener wire, or a connected series of embryo fastener elements, said apparatus comprising a support for rotatably supporting said reel, means to intermittently feed the wire in a longitudinal direction, means to sever the elements from the wire and to attach them to a tape, and means to maintain a loop of slack wire between the reel and the feed means, said means including a feeler to determine upper and lower limits for the loop of slack wire, an electric motor for rotating said reel in such direction as to unwind the wire, and switch means controlled by said feeler means for starting said motor when the slack reaches its upper position or minimum limit and for stopping said motor when the slack reaches its lower position or maximum limit.

53. Apparatus for manufacturing a slide fastener wire or connected series of embryo slide fastener elements, each of said elements having an embryo head with spread embryo jaws connected thereto, said embryo head having a projection and a recess and said embryo elements being connected between the spread embryo jaws, said apparatus comprising pressure rolls, one of said rolls having a periphery formed negatively to one side of the slide fastener wire, and the other having a periphery formed negatively to the other side of the slide fastener wire, and means to support and synchronously rotate the rolls in mating registration, said means including sturdy large diameter shafts, the shafts being parallel to one another and extending in opposite directions away from the pressure rolls, each of said rolls being formed integrally with a relatively long tapered shank having a threaded part at the small end thereof, the shafts having tapered holes dimensioned to matingly receive the tapered shanks of the rolls, and screw means for drawing the tapered shanks of the rolls axially into the shafts in order to secure the same rigidly in place.

54. Apparatus for manufacturing a slide fastener wire or connected series of embryo slide fastener elements, each of said elements having an embryo head with spread embryo jaws connected thereto, said embryo head having a projection and a recess, and said embryo elements being connected between the spread embryo jaws, said apparatus comprising pressure rolls, one having a periphery formed negatively to one side of the slide fastener wire, and the other having a periphery formed negatively to the other side of the slide fastener wire, means to support and synchronously rotate the rolls in mating registration, and a wire guide in the form of a finger having a wire guide passage extending longitudinally thereof, said finger being mounted in a position transverse of the plane of the shafts and extending toward the rolls to a point immediately adjacent the point of contact of the rolls with the wire.

GEORGE WINTRITZ.

Disclaimer 2,201,068.—*George Wintritz*, Staten Island, N. Y. MANUFACTURE OF SLIDE FASTENERS. Patent dated May 14, 1940. Disclaimer filed Mar. 8, 1949, by the assignee, *Conmar Products Corporation*.

Hereby enters this disclaimer to claims 43, 44, 45, 47, 48, 49, 50, 51, and 52 of said patent.

[*Official Gazette April 19, 1949.*]